United States Patent
Miroshnikov et al.

(10) Patent No.: US 12,050,975 B2
(45) Date of Patent: Jul. 30, 2024

(54) SYSTEM AND METHOD FOR UTILIZING GROUPED PARTIAL DEPENDENCE PLOTS AND SHAPLEY ADDITIVE EXPLANATIONS IN THE GENERATION OF ADVERSE ACTION REASON CODES

(71) Applicant: Discover Financial Services, Riverwoods, IL (US)

(72) Inventors: Alexey Miroshnikov, Evanston, IL (US); Konstandinos Kotsiopoulos, Easthampton, MA (US); Arjun Ravi Kannan, Buffalo Grove, IL (US); Raghu Kulkarni, Buffalo Grove, IL (US); Steven Dickerson, Deerfield, IL (US)

(73) Assignee: Discover Financial Services, Riverwoods, IL (US)

( * ) Notice: Subject to any disclaimer, the term of this patent is extended or adjusted under 35 U.S.C. 154(b) by 653 days.

(21) Appl. No.: 16/868,019

(22) Filed: May 6, 2020

(65) Prior Publication Data
US 2021/0350272 A1 Nov. 11, 2021

(51) Int. Cl.
*G06N 20/20* (2019.01)
*G06F 17/16* (2006.01)
(Continued)

(52) U.S. Cl.
CPC ............ *G06N 20/20* (2019.01); *G06F 17/16* (2013.01); *G06F 18/214* (2023.01); *G06N 20/00* (2019.01)

(58) Field of Classification Search
CPC ........ G06N 20/20; G06N 20/00; G06N 5/045; G06F 17/16; G06F 18/214; G06F 18/24137
See application file for complete search history.

(56) References Cited

U.S. PATENT DOCUMENTS 8,370,253 B1 * 2/2013 Grossman .............. G06Q 40/00
705/38
11,030,583 B1 6/2021 Garg et al.
(Continued)

FOREIGN PATENT DOCUMENTS

WO 2021/074491 A1 4/2021

OTHER PUBLICATIONS

Hu et. al (hereinafter Hu), Locally Interpretable Models and Effects based on Supervised Partitioning, Wells Fargo, 2018 (Year: 2018).*
(Continued)

*Primary Examiner* — Aniss Chad
*Assistant Examiner* — Shien Ming Chou
(74) *Attorney, Agent, or Firm* — Lee Sullivan Shea & Smith LLP

(57) ABSTRACT

A framework for interpreting machine learning models is proposed that utilizes interpretability methods to determine the contribution of groups of input variables to the output of the model. Input variables are grouped based on correlation with other input variables. The groups are identified by processing a training data set with a clustering algorithm. Once the groups of input variables are defined, partial dependent plot (PDP) tables for each group are calculated and stored in a memory, which are used for calculating scores related to each group of input variables for a given instance of the input vector processed by the model. Furthermore, Shapley Additive Explanations (SHAP) values for each group can be calculated by summing the SHAP values of the input variables for a given instance of an input vector per group. These scores can then be sorted, ranked for each interpretability method, and then combined into one hybrid ranking.

20 Claims, 9 Drawing Sheets

(51) Int. Cl.
  G06F 18/214    (2023.01)
  G06N 20/00     (2019.01)

(56) References Cited

U.S. PATENT DOCUMENTS

| | | | |
|---|---|---|---|
| 2014/0229415 | A1 | 8/2014 | Martineau et al. |
| 2018/0285685 | A1* | 10/2018 | Singh ............... G06F 16/9038 |
| 2019/0188605 | A1 | 6/2019 | Zavesky et al. |
| 2019/0279111 | A1* | 9/2019 | Merrill ............... G06N 20/20 |
| 2019/0378210 | A1 | 12/2019 | Merrill et al. |
| 2020/0081865 | A1 | 3/2020 | Farrar et al. |
| 2020/0082299 | A1 | 3/2020 | Affonso et al. |
| 2020/0184350 | A1 | 6/2020 | Bhide et al. |
| 2020/0218987 | A1 | 7/2020 | Jiang et al. |
| 2020/0302309 | A1 | 9/2020 | Golding |
| 2020/0320428 | A1 | 10/2020 | Chaloulos et al. |
| 2020/0372035 | A1 | 11/2020 | Tristan et al. |
| 2020/0372304 | A1 | 11/2020 | Kenthapadi et al. |
| 2020/0372406 | A1 | 11/2020 | Wick |
| 2020/0380398 | A1 | 12/2020 | Weirder et al. |
| 2021/0133870 | A1 | 5/2021 | Kamkar et al. |
| 2021/0174222 | A1 | 6/2021 | Dodwell et al. |
| 2021/0224605 | A1 | 7/2021 | Zhang et al. |
| 2021/0241033 | A1 | 8/2021 | Yang |
| 2021/0248503 | A1 | 8/2021 | Hickety et al. |
| 2021/0256832 | A1 | 8/2021 | Weisz et al. |
| 2021/0334654 | A1 | 10/2021 | Himanshi et al. |
| 2021/0383268 | A1 | 12/2021 | Miroshnikov et al. |
| 2021/0383275 | A1 | 12/2021 | Miroshnikov et al. |
| 2022/0036203 | A1 | 2/2022 | Nachum et al. |

OTHER PUBLICATIONS

Ding et. al, (hereinafter Ding) Comparisons of Two Ensemble Mean Methods in Measuring the Average Error Growth and the Predictability, the Chinese Meteorological Society and Springer-Verlag Berlin Heidelberg, 2011 (Year: 2011).*

Manu (hereinafter ManuP3) Interpretability Cracking open the black box—Part III, Deep & Shallow, 2019 (Year: 2019).*

Manu (hereinafter ManuP2) Interpretability Cracking open the black box—Part II, Deep & Shallow, 2019 (Year: 2019).*

Krivoruchko Using Multivariate Interpolation for Estimating Well Performance, Esri.com, 2014 (Year: 2014).*

Chen Comparison and Improvement of the predictability and interpretability with Ensemble Learning Models, Journal of Cheminformatics, Mar. 2020 (Year: 2020).*

Aas et al. Explaining Individual Predictions When Features are Dependent: More Accurate Approximations to Shapley Values. arXiv preprint arXiv:1903.10464v3, Feb. 6, 2020, 28 pages.

Albizuri et al. On Coalitional Semivalues. Games and Economic Behavior 49, Nov. 29, 2002, 37 pages.

Amer et al. The modified Banzhaf value for games with coalition structure: an axiomatic characterization. Mathematical Social Sciences 43, (2002) 45-54, 10 pages.

Alonso-Meijide et al. Modification of the Banzhaf Value for Games with a Coalition Structure. Annals of Operations Research, Jan. 2002, 17 pages.

Aumann et al. Cooperative Games with Coalition Structure. International journal of Game Theory, vol. 3, Issue 4, Jul. 1974, pp. 217-237.

Banzhaf III. Weighted Voting Doesn't Work: A Mathematical Analysis. Rutgers Law Review, vol. 19, No. 2, 1965, 28 pages.

Breiman et al. Estimating Optimal Transformations for Multiple Regression and Correlation. Journal of the American Statistical Association. vol. 80, No. 391, Sep. 1985, 19 pages.

Leo Breiman. Statistical Modeling: The Two Cultures. Statistical Science, vol. 16, No. 3, 2001, pp. 199-231.

Casas-Mendez et al. An extension of the tau-value to games with coalition structures. European Journal of Operational Research, vol. 148, 2003, pp. 494-513.

Chen et al. True to Model or True to the Data? arXiv preprint arXiv:2006.1623v1, Jun. 29, 2020, 7 pages.

Cover et al. Elements of Information Theory. A John Wiley & Sons, Inc., Publication. Second Edition, 2006, 774 pages.

Hall et al. An Introduction to Machine Learning Interpretability, O'Reilly, Second Edition, Aug. 2019, 62 pages.

Dickerson et al. Machine Learning. Considerations for fairly and transparently expanding access to credit. 2020, 29 pages [online]. Retrieved online: URL<https://info.h2o.ai/rs/644-PKX-778/images/Machine%20Learning%20-%20Considerations%20for%20Fairly%20and%20Transparently%20Expanding%20Access%20to%20Credit.pdf>.

Dubey et al. Value Theory Without Efficiency. Mathematics of Operations Research. vol. 6, No. 1. 1981, pp. 122-128.

Equal Credit Opportunity Act (ECOA). FDIC Law, Regulations, Related Actions, 9 pages [online]. Retrieved online: URL< https://www.fdic.gov/regulations/laws/rules/6000-1200.html>.

Elshawi et al. On the interpretability of machine learning-based model for predicting hypertension. BMC Medical Informatics and Decision Making. vol. 19, No. 146. 2019, 32 pages.

Gretton et al. Measuring Statistical Dependence with Hilbert-Schmidt Norms. In Algorithmic Learning Theory. Springer-Verlag Berlin Heidelberg. 2005, pp. 63-77.

Gretton et al. A Kernel Statistical Test of Independence. In Advances in Neural Information Processing Systems. 2007, 8 pages.

Hall, Patrick. On the Art and Science of Explainable Machine Learning: Techniques, Recommendations, and Responsibilties. KDD '19 XAI Workshop. arXiv preprint arxiv:1810.02909, Aug. 2, 2019, 10 pages.

Hastie et al. The Elements of Statistical Learning: Data Mining, Interference, and Prediction. Springer. Second edition, Jan. 13, 2017, 764 pages.

Heller et al. A consistent multivariate test of association based on ranks of distances. Biometrika. arXiv:1201.3522v1. Jan. 17, 2012, 14 pages.

Heller et al. Consistent Distribution-Free K-Sample and Independence Tests for Univariate Random Variables. Journal of Machine Learning Research. vol. 17, No. 29. Feb. 2016, 54 pages.

Hoeffding, Wassily. A Non-Parametric Test of Independence. The Annals of Mathematical Statistics. 1948, pp. 546-557.

Janzing et al. Feature relevance quantification in explainable AI: A causal problem. arXiv preprint arXiv:1910.13413v2. Nov. 25, 2019, 11 pages.

Jiang et al. Nonparametric K-Sample Tests via Dynamic Slicing. Journal of the American Statistical Association. Harvard Library. Sep. 11, 2015. pp. 642-653.

Ji et al. Post-Radiotherapy PET Image Outcome Prediction by Deep Learning Under Biological Model Guidance: A Feasibility Study of Oropharyngeal Cancer Application. Duke University Medical Center. arXiv preprint. 2021, 26 pages.

Jollife et al. Principal Component Analysis. Springer Series in Statistics. Second Edition, 2002, 518 pages.

Kamijo, Yoshio. A two-step Shapley value in a cooperative game with a coalition structure. International Game Theory Review. 2009, 11 pages.

Kraskov et al. Estimating mutual information. The American Physical Society. Physical Review E vol. 69. Jun. 23, 2004, 16 pages.

Lundberg, Scott. Welcome to SHAP Documentation. 2018, 46 pages [online]. Retrieved online URL:< https://shap.readthedocs.io/en/latest/>.

Lipovetsky et al. Analysis of regression in game theory approach. Applied Stochastic Models Business and Industry. vol. 17. Apr. 26, 2001, pp. 319-330.

Lopez-Paz et al. The Randomized Dependence Coefficient. In Advances in Neural Information Processing Systems. 2013, pp. 1-9.

Lorenzo-Freire, Silvia. New characterizations of the Owen and Banzhaf-Owen values using the intracoalitional balanced contributions property. Department of Mathematics. 2017, 23 pages.

Modarres et al. Towards Explainable Deep Learning for Credit Lending: A Case Study. arxiv:1811.06471v2, Nov. 11, 2018, 8 pages.

(56) References Cited

OTHER PUBLICATIONS

Owen, Guillermo. Values of Games with a Priori Unions. In: Essays in Mathematical Economics and Game Theory. Springer, 1977, pp. 76-88.
G. Owen. Modification of the Banzhaf-Coleman index for Games with a Priori Unions. Power, Voting and Voting Power. 1981, pp. 232-238.
Paninski, Liam. Estimation of Entropy and Mutual Information. Neural Computation, vol. 15, No. 6. 2003, pp. 1191-1253.
Reshef et al. Detecting Novel Associations in Large Data Sets. Science, vol. 334. Dec. 2011, pp. 1518-1524.
Reshef et al. An Empirical Study of Leading Measures of Dependence. arXiv:1505.02214v2. May 12, 2015, 42 pages.
Reshef et al. Measuring Dependence Powerfully and Equitably. Journal of Machine Learning Research, vol. 17. 2016, 63 pages.
Renyi. On Measures of Dependence. Acta mathematica hungarica, vol. 10, No. 3.1959, pp. 441-451.
Strumbelji et al. Explaining prediction models and individual predictions with feature contributions. Springer. Knowledge Information System, vol. 41, No. 3. 2014, pp. 647-665.
Sundararajan et al.The Many Shapley Values for Model Explanation. arXiv preprint arXiv:1908.08474v1, Aug. 22, 2019, 9 pages.
Szekely et al. Measuring and Testing Dependence by Correlation of Distances. The Annals of Statistics, vol. 35, No. 6. 2007. 26 pages.
Szekely et al. Brownian Distance Covariance. The Annals of Applied Statistics, vol. 3, No. 4. 2009. 31 pages.
Young. Monotonic Solutions of Cooperative Games International Journal of Game Theory, vol. 14, Issue 2. 1985. 8 pages.
Tibshirani et al. Estimating the number of clusters in a dataset via the gap statistic. Journal of the Royal Statistical Society, Series B. vol. 63, Part 2. 2001. pp. 411-423.
Tijs. Bounds for the Core and The Tau-Value. Game Theory and Mathematical Economics. 1981, pp. 123-132.
Vidal-Puga, Juan. The Harsanyi paradox and the ""right to talk"" in bargaining among coalitions. Mathematical Social Sciences. vol. 64. Mar. 27, 2012. 32 pages.
Zeng et al. Jackknife approach to the estimation of mutual information. PNAS, vol. 115, No. 40. Oct. 18, 2018. 6 pages.
Zhao et al. Causal Interpretations of Black-Box Models. J Bus., Econ. Stat., DOI:10.1080/07350015.2019.1624293, 2019, 16 pages.
Wang et al. Shapley Flow: A Graph-based Approach to Interpreting Model Predictions arXiv preprint arXiv:2010.14592, 2020, 11 pages.
Miroshinikov et al. Mutual Information-based group explainers with coalition structure for machine learning model explanations. Computer Science and Game Theory. arXiv:2102.10878v1. Feb. 22, 2021, 46 pages.
Miroshinikov et al. Wasserstein-based faireness interpretability framework for machine learning models. arXiv:2011.03156v1. Nov. 6, 2020, 34 pages.
Miroshinikov et al. Model-agnostic bias mitigation methods with regressor distribution control for Wasserstein-based fairness metrics. arXiv:2111.11259v1. Nov. 19, 2021, 29 pages.
Hastie et al., *The Elements of Statistical Learning: Data Mining, Inference, and Prediction,* 2nd ed., pp. 43-49, 119-122, 305-313, 353-361, 367-370, 392-401, Springer Series in Statistics (2008).
Vanderbei, Robert J. *Linear Programming: Foundations and Extensions,* 4th ed., pp. 11-16, 141-144, New York, NY, Springer Science and Business Media (2014).
Wasserman, Larry, *All of Statistics: A Concise Course in Statistical Inference,* pp. 47-50, 54-55, 76, 404-405, New York, NY, Springer Science and Business Media (2004).
Abduljabbar et al., "Applications of Artificial Intelligence in Transport: An Overview," *Sustainability* (2019).
Apley et al., "Visualizing the Effects of Predictor Variables in Black Box Supervised Learning Models," *ArXiv* (2016).
Bzdok et al., "Statistics Versus Machine Learning," Nature Methods, vol. 15, 233-234 (Apr. 2018).
"Explainable Artificial Intelligence (xAI)," *Defense Advanced Research Projects Agency,* DARPA-BAA-16-53 (2016).

FDIC Title VII—Equal Credit Opportunity, FDIC Law, Regulations, Related Acts—Consumer Protection, (Dec. 31, 2019).
Friedman, J.H., "Greedy Function Approximation: A Gradient Boosting Machine," *Annals of Statistics,* vol. 29, 1189-1232 (2001).
Goldstein et al., "Peeking Inside the Black Box: Visualizing Statistical Learning with Plots of Individual Conditional Expectation," *J. Computational and Graphical Statistics,* vol. 24, 44-65 (2015).
Hall, Patrick, "On the Art and Science of Explainable Machine Learning: Techniques, Recommendations, and Responsibilities," KDD '19 XAI Workshop, Aug. 4-8, 2019, Anchorage, AK.
Hu et al., "Locally Interpretable Models and Effects Based on Supervised Partitioning (LIME-SUP)," *Corporate Model Risk, Wells Fargo* (Jun. 1, 2018).
Leo et al., "Machine Learning in Banking Risk Management: A Literature Review," *Risks* (2019).
Lundberg et al., "A Unified Approach to Interpreting Model Predictions," $31^{st}$ *Conference on Neural Information Processing Systems,* Long Beach, CA (2017).
Lundberg et al., "Consistent Individualized Feature Attribution for Tree Ensembles," ArXiv1802.03888 (2019).
Ribeiro et al., "'Why Should I Trust You?' Explaining the Predictions of Any Classifier," $22^{nd}$ *Conference on Knowledge Discovery and Data Mining,* San Francisco, CA (2016).
SAS/STAT® User's Guide, Version 8, Chapter 68 "The VARCLUS Procedure" (1999).
Shapley, L.S., "A Value for n-Person Games," *Annals of Mathematics Studies,* 307-317 (1953).
Vaughan et al., "Explainable Neural Networks based on Additive Index Models," *Corporate Model Risk,* Wells Fargo, USA (Jun. 2018).
Wehle et al., "Machine Learning, Deep Learning, and AI: What's the Difference?" Data Scientist Innovation Day (2017).
Wuest et al., "Machine Learning in Manufacturing: Advantages, Challenges and Applications," Production and Manufacturing Research, vol. 4, 23-45 (2016).
International Search Report and Written Opinion issued in International Application No. PCT/US2022/029670, mailed on Sep. 7, 2022, 10 pages.
Aurenhammer et al., *Voronoi Diagrams and Delaunay Triangulations,* pp. 7-13, 41-45, New Jersey, World Scientific Publishing (2013).
Eggleston, H.G., *Convexity,* pp. 33-38, Cambridge University Press (1958).
Shiryaev, A.N., *Graduate Texts in Mathematics: Probability,* $2^{nd}$ ed., pp. 23-43, Springer (1980).
Jiang et al. Wasserstein Fair Classification. Proceedings of the Thirty-Fifth Conference on Uncertainty in Artificial Intelligence, arXiv:1907.12059v1 [stat.ML] Jul. 28, 2019, 15 pages. <URL: chrome-extension://efaidnbmnnnibpcajpcglclefindmkaj/http://proceedings.mlr.press/v115/jiang20a/jiang20a.pdf>.
Wei et al. Optimized Score Transformation for Consistent Fair Classication, arXiv:1906.00066v3 [cs.LG] Oct. 29, 2021, 78 pages <URL: chrome-extension://efaidnbmnnnibpcajpcglclefindmkaj/https://arxiv.org/pdf/1906.00066.pdf>.
Iosifidis et al. FAE: A Fairness-Aware Ensemble Framework, IEEE, arXiv:2002.00695v1 [cs.AI] Feb. 3, 2020, 6 pages. <URL:https://arxiv.org/abs/2002.00695>.
Balashankar et al. Pareto-Efficient Fairness for Skewed Subgroup Data. In the International Conference on Machine Learning AI for Social Good Workshop. vol. 8. Long Beach, United States, 2019, 8 pages.
Barocas et al. Fairness and Machine Learning: Limitations and Opportunities. [online], 253 pages, 1999 [retrieved online on May 26, 2022]. Retrieved from the Internet:<URL:https://fairmlbook.org/>.
Bergstra et al. Algorithms for Hyper-Parameter Optimization. NIPS 11: Proceedings of the 24th International Conference on Neural Information Processing Systems Dec. 2011, 9 pages.
Bousquet et al. Stability and Generalization. Journal of Machine Learning Research. Mar. 2, 2002, pp. 499-526.
Del Barrio et al. Obtaining fairness using optimal transport theory. arXiv preprint arXiv:1806.03195v2. Jul. 19, 2018, 25 pages.

(56) References Cited

OTHER PUBLICATIONS

Del Barrio et al. On Approximate Validation of Models: A Kolmogorov-Smirnov Based Approach. arXiv:1903.08687v1, Mar. 20, 2019, 32 pages.
Dwork et al. Generalization in Adaptive Data Analysis and Holdout Reuse. NIPS'15: Proceedings of the 28th International Conference on Neural Information Processing Systems, vol. 2, Dec. 2015, 9 pages.
Dwork et al., "Fairness Through Awareness" Proceedings of the 3rd Innovations in Theoretical Computer Science Conference, 214-226 (2012).
Equal Employment Opportunity Act. 2 pages [online]. Retrieved online: URL<https://www.dol.gov/sites/dolgov/files/ofccp/regs/compliance/posters/pdf/eeopost.pdf>.
Fair Housing Act (FHA). FDIC Law, Regulations, Related Actions, 3 pages [online]. Retrieved online: URL< https://www.ecfr.gov/current/title-12/chapter-III/subchapter-B/part-338.
Feldman et al., "Certifying and Removing Disparate Impact" Proceedings of the 21th ACM SIGKDD International Conference on Knowledge Discovery and Data Mining, 259-268 (2015).
Hall et al. A United States Fair Lending Perspective on Machine Learning. Frontiers in Artificial Intelligence. doi: 10.3389/frai.2021.695301, Jun. 7, 2021, 9 pages.
Hardt et al., "Equality of Opportunity in Supervised Learning" Advances in Neural Information Processing Systems, 3315-3323 (2015).
Hashimoto et al. Fairness Without Demographics in Repeated Loss Minimization. In ICML, 2018, 10 pages.
Jiang et al. Identifying and Correcting Label Bias in Machine Learning. Proceedings of the 23rd International Conference on Artificial Intelligence and Statistics (AISTATS). 2020, 10 pages.
Jiang et al. Smooth Isotonic Regression: A New Method to Calibrate Predictive Models. AMIA Joint Summits on Translational Science proceedings. 2011, pp. 16-20.
Thorpe, Matthew, Introduction to Optimal Transport, University of Cambridge (2018).
Kamiran et al. Classifying without Discriminating. 2009 2nd International Conference on Computer, Control and Communication. doi: 10.1109/IC4.2009.4909197. 2009, pp. 1-6.
Kamiran et al. Data Preprocessing Techniques for Classification Without Discrimination. Knowl. Inf. Syst. DOI 10.1007/s10115-011-0463-8. Dec. 3, 2011, 33 pages.
Kamiran et al. Discrimination Aware Decision Tree Learning. 2010 IEEE International Conference on Data Mining. doi: 10.1109/ICDM.2010.50. 2010, pp. 869-874.
Kamishima et al. Fairness-Aware Classifier with Prejudice Remover Regularizer. Proceedings of the European Conference on Machine Learning and Principles and Practice of Knowledge Discovery in Databases (ECMLPKDD), Part II. 2012, pp. 35-50.
Karush, William. Minima of Functions of Several Variables with Inequalities as Side Constraints. A Dissertation Submitted to the Faculty of the Division of the Physical Sciences in Candidacy for the Degree of Master in Science. Department of Mathematics. University of Chicago. Dec. 1939, 29 pages.
Kearns et al. Algorithmic Stability and Sanity-Check Bounds for Leave-One-Out Cross-Validation. Neural Computation, vol. 11, No. 6. 1999, pp. 1427-1453.
Koralov et al. Theory of Probability and Random Processes. Second Edition. Springer. 1998, 349 pages.
Kovalev et al. A robust algorithm for explaining unreliable machine learning survival models using the Kolmogorov-Smirnov bounds. Neural Networks. arXiv:2005.02249v1, May 5, 2020. pp. 1-39.
Kuhn et al. Nonlinear programming. In Proceedings of the Second Berkeley Symposium on Mathematical Statistics and Probability. Berkeley, Calif. University of California Press. 90. 1951, pp. 481-492.
Lahoti et al. Fairness without Demographics through Adversarially Reweighted Learning. arXiv preprint arXiv:2006.13114. 2020, 13 pages.
Markowitz, Harry. Portfolio Selection. The Journal of Finance. vol. 7, No. 1. 1952, pp. 77-91.
Pareto. Optimality. In: Multiobjective Linear Programming. Springer International Publishing. DOI 10.1007/978-3-319-21091-9_4. 2016, pp. 85-118.
Perrone et al. Fair Bayesian Optimization. AIES '21, May 19-21, 2021, Virtual Event, USA. pp. 854-863.
Rawls, John. Justice as Fairness: A Restatement. Harvard University Press. 2001, 32 pages.
Royden et al. Real Analysis. Boston: Prentice Hall, 4th Edition. 2010, 516 pages.
Santambrogio, Filippo. Optimal Transport for Applied Mathematicians. Calculus of Variations, PDEs and Modeling. Springer. May 2015, 356 pages.
Schmidt et al. An Introduction to Artificial Intelligence and Solutions to the Problems of Algorithmic Discrimination. arXiv preprint arXiv:1911.05755. vol. 73, No. 2. 2019, pp. 130-144.
Shiryaev, A.N. Probability. Springer, Second Edition. 1980, 22 pages.
Shorack et al. Empirical Processes with Applications to Statistics. Wiley, New York. 1986, 36 pages.
Villani, Cedric. Optimal Transport, Old and New. Springer. Jun. 13, 2008, 998 pages.
Woodworth et al. Learning Non-Discriminatory Predictors. Proceedings of Machine Learning Research, vol. 65, No. 1-34. 2017, 34 pages.
Zemel et al. Learning Fair Representations. Proceedings of the 30th International Conference on Machine Learning, PMLR vol. 28, No. 3. 2013, pp. 325-333.
Zhang et al. Mitigating Unwanted Biases with Adversarial Learning. In Proceedings of the 2018 AAAI/ACM Conference on AI, Ethics, and Society. Feb. 2-3, 2018, pp. 335-340.
Blum et al. Recovering from Biased Data: Can Fairness Constraints Improve Accuracy? Toyota Technological Institute at Chicago arXiv:1912.01094v1 [cs.LG] Dec. 4, 2019, 20 pages.
Varley et al. Fairness in Machine Learning with Tractable Models. School of Informatics, University of Edinburgh, UK arXiv:1905.07026v2 [cs.LG] Jan. 13, 2020, 26 pages.
Hickey et al. Fairness by Explicability and Adversarial SHAP Learning. Experian UK&I and EMEA DataLabs, London, UK arXiv:2003.05330v3 [cs.LG] Jun. 26, 2020, 17 pages.
Bellamy et al. AI Fairness 360: An extensible toolkit for detecting and mitigating algorithmic bias, IBM J. Res. & Dev. vol. 63, No. 4/5, Paper 4. Jul./Sep. 2019. 15 pages.
Lohia et al. Bias Mitigation Post-Processing for Individual and Group Fairness. IBM Research and IBM Watson AI Platform. 978-1-5386-4658-8/18/$31.00. 2019. IEEE. 5 pages.
Gretton et al. A Kernel Two-Sample Test. The Journal of Machine Learning Research. vol. 13, No. 1. Mar. 2012, pp. 723-773.

* cited by examiner

SYSTEM AND METHOD FOR UTILIZING GROUPED PARTIAL DEPENDENCE PLOTS AND SHAPLEY ADDITIVE EXPLANATIONS IN THE GENERATION OF ADVERSE ACTION REASON CODES

TECHNICAL FIELD

The present disclosure relates to machine learning. More specifically, the embodiments set forth below describe systems and methods for generating adverse action reason codes based on analysis of machine learning models.

BACKGROUND

Machine Learning (ML) and Artificial Intelligence (AI) methodologies are in widespread use in many different industries, such as transportation, manufacturing, and many others. Financial services companies have begun deployment of machine learning models in many of their business processes to improve the services they offer. For example, instead of a banker manually checking a customer's credit history to make a determination on a lending decision, a machine learning model can be designed to analyze the customer's credit history in order to make the determination. This not only improves the efficiency of the business by increasing the speed with which the determination can be made, but it removes the bias of the banker from the determination.

Financial services companies are regulated through the Equal Credit Opportunity Act (ECOA), which states that firms engaged in extending credit must do so without regard to certain aspects of the Applicants for the credit. For example, age, race, or gender may be characteristics of the Applicant that cannot be taken into consideration. If an Applicant is denied credit, then that Applicant must be informed as to which factors contributed the most to that decision. The factors provided to the Applicant can be referred to as Adverse Action Reason Codes (AARCs).

For a number of years, bankers may have been aided by various automated algorithms in making such determinations. The complexity of these algorithms was typically limited, and the decisions coded into the software could be manually analyzed or otherwise designed to output a specific AARC for why a negative determination was reached. For example, traditional statistical techniques such as linear or logistic regression generate coefficients that represent the contribution weight of the corresponding independent variables to an output, enabling the coefficients to be ranked to generate the AARCs related to a number of the largest coefficients.

However, as ML models are incorporated into these algorithms, the requirement for generating AARCs becomes difficult. Many ML models are extremely complex and the predictive capabilities of a model are difficult to analyze. For example, it may not be immediately apparent how a label output of a classifier model is related to the input of the classifier model. Therefore, it can be difficult to rank what inputs had the largest effect on a negative determination reached based on the output generated by the predictive model. By incorporating a ML model into certain decision making processes in extending credit to consumers, a financial services company faces certain hurdles with adhering to the ECOA. Thus. there is a need for addressing these issues and/or other issues associated with the prior art.

SUMMARY

A method, computer readable medium, and system are disclosed for utilizing partial dependence plots in the interpretation of ML models. Input variables in an input vector for the model are analyzed via a clustering algorithm to divide the set of input variables into groups based on correlation. Partial dependence plot (PDP) tables are then generated and stored in a memory for each of the groups of input variables. As new instances of the input vector are processed by the ML model, a ranking vector comprising scores for each of the groups is generated that indicates the contribution of each group of input variables to the output of the ML model.

In some embodiments, a method is described for interpreting a ML model. The method includes the steps of: receiving an input vector, processing, by a ML model, the input vector to generate an output vector, and generating, based on a plurality of partial dependence plot (PDP) tables stored in a memory, a ranking vector that indicates a score for each group of input variables in a plurality of groups of input variables of the input vector. At least one group in the plurality of groups includes two or more input variables, and correlation of input variables within a group is stronger than correlation of input variables between groups.

In some embodiments, the input variables included in the input vector are divided into the plurality of groups based on a clustering algorithm applied to a training data set comprising a number of instances of the input vector.

In an embodiment, the method further includes the steps of: generating, for each group in the plurality of groups, a grid of points in a p-dimensional space associated with p input variables included in the group, and generating, for each group in the plurality of groups, a corresponding PDP table in the plurality of PDP tables based on the training data set and the grid of points. In an embodiment, the grid of points is generated by randomly or pseudo-randomly selecting $11^p$ points for the group.

In some embodiments, the method further includes the steps of: identifying m number of groups of input variables having scores in the ranking vector that are included in a subset of the m highest scores in the ranking vector, and generating m adverse action reason codes corresponding to the identified m number of groups.

In an embodiment, the output vector includes an element that represents a determination related to a consumer's credit. In an embodiment, the method further includes the steps of: generating, at a server device associated with a financial service provider, a communication to transmit to a device associated with the consumer. The communication includes information corresponding to the m adverse action reason codes.

In some embodiments, each score in the ranking vector is generated by performing a multivariate interpolation of a number of sample points in a corresponding PDP table based on a tuple selected from the input vector. The tuple includes a vector of values that correspond to the input variables in the input vector that correspond with the group of input variables for the score.

In some embodiments, the multivariate interpolation comprises one of the group consisting of: a nearest neighbor algorithm; an inverse distance weighting algorithm; a spline interpolation algorithm; and a Delaunay triangulation algorithm.

In some embodiments, the method further includes the steps of: processing, by a second ML model, the input vector to generate a second output vector, and generating, based on a second plurality of PDP tables stored in the memory, a second ranking vector.

In some embodiments, the ML model comprises one of the group consisting of: a neural network model; a linear or logistic regression model; and a gradient boosting machine model. In an embodiment, the method further includes the step of training the ML model based on a training data set that includes N instances of the input vector and N corresponding target output vectors.

In some embodiments, the score for each group of input variables represents a hybrid score generated by calculating a geometric mean for a plurality of ranking vectors associated with different algorithms. The plurality of ranking vectors includes: a first ranking vector that indicates a score for each group of input variables based on the plurality of PDP tables; and a second ranking vector that indicates a score for each group of input variables based on Shapley Additive Explanation (SHAP) values.

In some embodiments, a system is disclosed for interpreting a ML model. The system includes a memory and one or more processors coupled to the memory. The memory stores the ML model and a plurality of PDP tables. The one or more processors are configured to: receive an input vector, process, by the ML model, the input vector to generate an output vector, and generate, based on the plurality of PDP tables, a ranking vector that indicates a score for each group of input variables in a plurality of groups of input variables of the input vector. At least one group in the plurality of groups includes two or more input variables, and correlation of input variables within a group is stronger than correlation of input variables between groups.

In some embodiments, at least one processor of the one or more processors and the memory are included in a server device configured to implement a service. The service is configured to receive a request to process a credit application and, responsive to determining that the credit application is denied, generate one or more adverse action reason codes associated with the credit application.

In some embodiments, a non-transitory computer-readable media is disclosed that stores computer instructions that, when executed by one or more processors, cause the one or more processors to perform the method described above.

DETAILED DESCRIPTION

The terms "Explainable Artificial Intelligence" (xAI) or "Machine Learning Interpretability" (MLI) refer to techniques that aim to explain ML model outputs by assigning quantities to the values of the input variables, which in turn represent the input variables' contributions to the ML model output. Various techniques that have been employed for this task include: Local Interpretable Model-agnostic Explanations (LIME); Partial Dependence Plots (PDP); Accumulated Local Effects (ALE); Shapley Additive Explanations (SHAP); and Explainable Neural Networks (xNN).

LIME uses a linear function as a local approximation for a ML model, and then uses the linear function as a surrogate model for explaining the output. PDP is a technique that utilizes the ML model directly to generate plots that show the impact of a subset of the predictor vector on the output of the ML model. PDP is similar to Individual Conditional Expectation (ICE) plots, except an ICE plot is generated by varying a single input variable given a specific instance of the input variable, whereas a PDP plot is generated by varying a subset of the input variables after the complementary set of variables has been averaged out. ALE takes PDP a step further and partitions the predictor vector space and then averages the changes of the predictions in each region rather than the individual input variables. SHAP takes into account all different combinations of input variables with different subsets of the predictor vector as contributing to the output prediction. xNN is a technique whereby a neural network is decomposed into a linear combination of sub-networks that each are trained to implement a non-linear function such that the neural netwok can be described as a weighted combination of the non-linear functions. The weights are utilized to determine which sub-network contributes the most to the predictions.

None of the aforementioned techniques is perfect for describing the behavior of complex ML models. LIME utilizes an easy to explain surrogate linear function, but that function is only accurate within a small local region of the predictor vector space. PDP provides a global interpretation of the ML model, but may be less accurate when there are strong correlations between input variables in the predictor vector. SHAP may be accurate but can be extremely costly to evaluate.

In some embodiments, PDP is selected as the preferred technique used to evaluate the ML model. In order to overcome the disadvantage of PDP due to correlation of input variables, the PDP technique is improved by grouping predictors. In other words, instead of treating each individual input variable in the predictor vector as independent, ML model outputs are attributable to groups of similar input variables. A Grouped PDP (GPDP) framework is described further herein that can be utilized in the generation of AARCs by analyzing ML models, thereby helping financial service companies to adhere to the EOCA.

Figure 1:
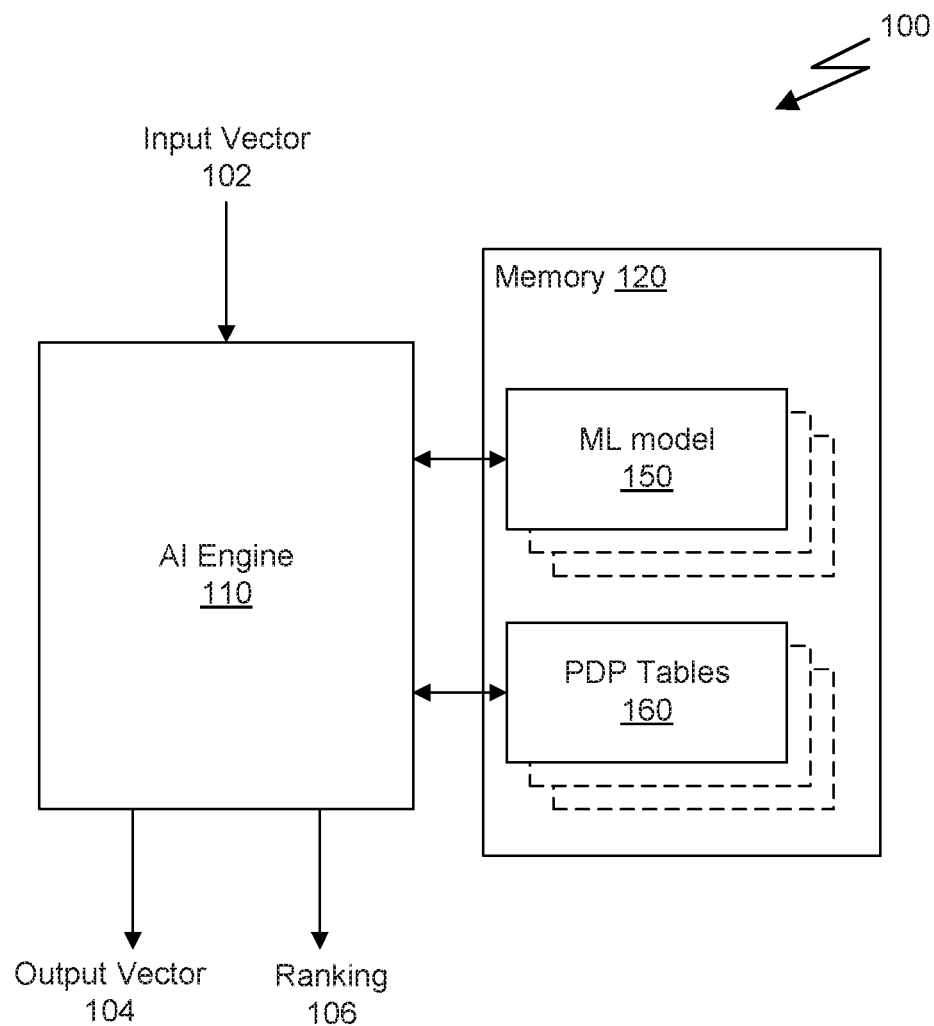
FIG. 1 illustrates a system for interpreting machine learning models, in accordance with some embodiments.

FIG. 1 illustrates a system 100 for interpreting machine learning models, in accordance with some embodiments. As depicted in FIG. 1, the system 100 includes an AI engine 110 coupled to a memory 120. In one embodiment, the AI engine 110 comprises a processor configured to implement one or more ML models 150 stored in the memory 120. The processor can be a central processing unit (CPU), a parallel processing unit (PPU), a system on a chip (SoC) that includes one or more CPU cores and one or more graphics processing unit (GPU) cores, or the like. The memory 120 can be a volatile memory such as dynamic random access memory (DRAM) or the like. In some embodiments, the memory 120 can include a non-volatile memory such as a hard disk drive (HDD), solid state drive (SSD), Flash memory, or the like. The non-volatile memory can be used as a backing store for the volatile memory.

In some embodiments, each ML model 150 can refer to a set of instructions designed to implement a specific ML algorithm. In some instances, the ML algorithm can comprise a linear or logistic regression algorithm. In other instances, the ML algorithm can comprise a neural network such as a CNN or RNN. It will be appreciated that the ML model 150 can be designed to be one of a wide range of ML algorithms, including regression algorithms, neural networks, classifiers, and the like.

In some embodiments, the AI engine 110 is configured to receive an input vector 102. The input vector 102 can be a one-dimensional array of scalar values, each scalar value representing an input variable. In other embodiments, the input vector 102 can be d-dimensional where d is at least two. For example, the input vector 102 could represent a plurality of one dimensional sample vectors collected at different points of time such that the input vector 102 is a matrix of scalar values. In other embodiments, the input vector 102 is an image (e.g., a two-dimensional array of pixel values). Each pixel value can be, e.g., a scalar value or a tuple of scalar values (such as RGB values). Each pixel value can also represent various concepts such as the color of object in a scene, a depth of objects in a scene, a temperature of objects in a scene, or the like.

The AI engine 110 loads a particular ML model 150 from the memory 120 and processes the input vector 102 by the ML model 150. The ML model 150 generates an output vector 104. The output vector 104 can comprise a single scalar value, a one-dimensional vector that includes a plurality of scalar values, or a d-dimensional hypersurface. In an embodiment, the output vector 104 represents a classifier. For example, the output of a particular ML model 150 could contain a number of scalar values in a one-dimensional vector, where each value corresponds to a probability that the entity described by the input vector 102 corresponds to a particular class associated with that index of the output vector 104.

In some embodiments, the AI engine 110 is also configured to generate a ranking vector 106 based on a plurality of partial dependence plot (PDP) tables stored in the memory 120. The ranking vector 106 includes a plurality of values that indicate a score for each group of input variables in a plurality of groups of input variables of the input vector 102. At least one group in the plurality of groups includes two or more input variables of the input vector 102, and the correlation of input variables within a group is stronger than correlation of input variables between groups.

The ranking vector can indicate, for each group of input variables, how much that set of input variables contributed to the output vector 104. In general, the score represents a strength of a gradient associated with a particular group of input variables. For example, if a small change in one of the input variables would cause the output vector to change drastically, then that input variable is associated with a large gradient value. The score represents a weighted sum of the gradients associated with all of the input variables within a group of input variables, given a particular instance of the input vector 102. Thus, the ranking vector 106 can be sorted to identify the groups of input variables within an input vector 102 that have the largest effect on the output vector 104 for a particular ML model 150. By sorting the ranking vector 106 by order from largest to smallest score, the groups of input variables contributing the most to the result represented by the output vector 104 can be identified.

Figure 2:
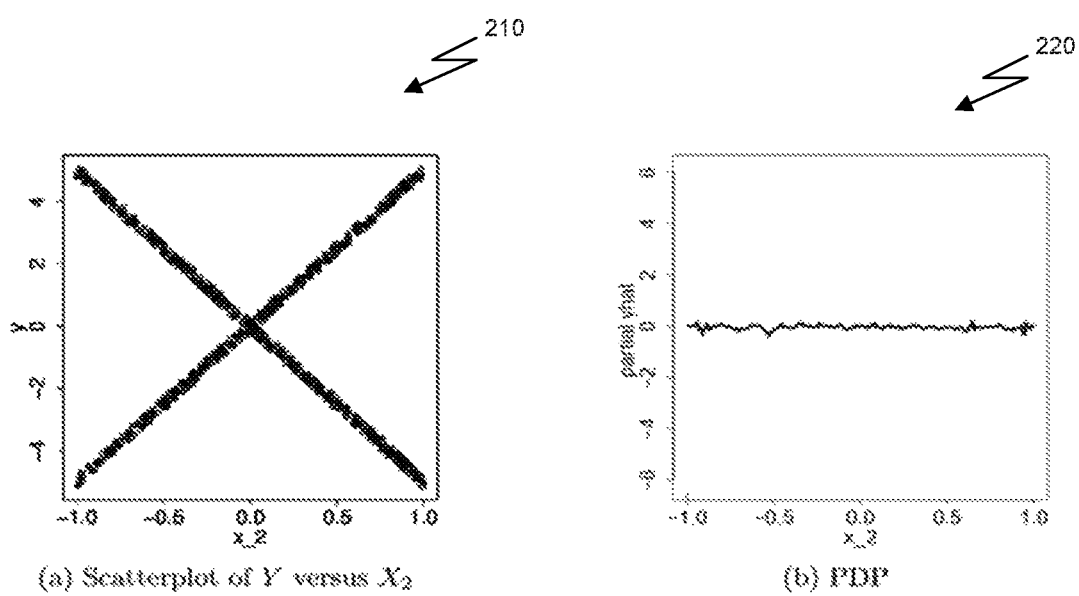
FIG. 2 illustrates graphs corresponding to an example ML model, in accordance with the prior art.

FIG. 2 illustrates graphs 210, 220 corresponding to an example ML model, in accordance with the prior art. An example ML model is provided for illustrative purposes to describe the potential problems with using PDP in the evaluation/interpretation of any ML model. Generally, PDP provides an analyst with a tool for visualizing the overall effect of a set of predictor values (e.g., input variables) to the output of the model. However, since PDP provides the user with an effect that a set of predictor values has on the output of the model in view of the average effect of the complement set of predictors, care must be taken when evaluating a PDP for any particular set of predictors (e.g., input variable) because the PDP may not account for interaction between that set of predictors and other predictors in the complement set of predictors.

For example, the partial dependence function for a model f is given as follows:

$$\bar{f}_S(X_S) = \int f(X_S, z) p_{X_C}(z) dz, \quad \text{(Eq. 1)}$$

where $X_S$ is a subvector of the input vector, $X_C$ is the complement subvector of the input vector, and $p_{X_C}(z)$ is the probability density function of the complement vector $X_C$. To illustrate the potential issues with using the PDP, a model f can be defined, e.g., as follows:

$$f(X) = 0.2X_1 - 5X_2 + 10X_2 1_{X_S \geq 0} + \in, \quad \text{(Eq. 2)}$$

where each component of X ranges uniformly between −1 and 1 and the error E represents noise having a normal distribution and the components of X and E are all independent. The scatterplot 210 of values for Y=f (X) versus component $X_2$, given 1000 random instances of X is shown in FIG. 2(a). We can see that the value of the output Y depends on the value of $1_{X_S \geq 0}$, which in turn depends on the values of $X_S$ in the instance of the input. It is clear from FIG. 2A that there is some meaningful association between Y and $X_2$. However, because the PDP 220, as shown in FIG. 2(b), represents the effect of $X_2$ given the average effects of the complement vector $(X_1, X_3)$, the PDP 220 shows very little effect on the output of Y based on the value of $X_2$. The reason that the PDP is not useful in this instance is that there is an interaction between the components $X_2$ and $X_3$ in Equation 2 and the average effects cancel each other out.

What this means for the ranking vector 106 is that calculating a score for every possible combination of sets of input variables can lead to inaccuracies. For example, a score for $X_2$ based on the PDP in FIG. 2(b) would be low and the component $X_2$ would be ranked lower than it should be with respect to other components of the input vector. In order to avoid this issue, a grouped PDP framework is proposed where input variables within the input vector are first grouped based on correlation with other input variables, and then PDP tables for each group are calculated and used for calculating the scores. Because each of the identified groups of variables minimizes the correlation with other groups of variable, the PDP for each group more accurately reflects the actual strength of contribution for that particular group to the output.

In some embodiments, evaluation of a training data set is performed in order to cluster input variables having high correlations into groups of related input variables, where correlation of variables between groups is lower than correlation of variables within groups. PDP tables are only generated corresponding to the grouped clusters having high correlations between variables. Consequently, the ranking vector 106 is generated based on the results of the clustering, which has tried to avoid the introduction of any PDP that might not reflect accurately the contribution of a selected group of input variables given the correlation of that set of variables with other input variables in the complement vector.

Figure 3:
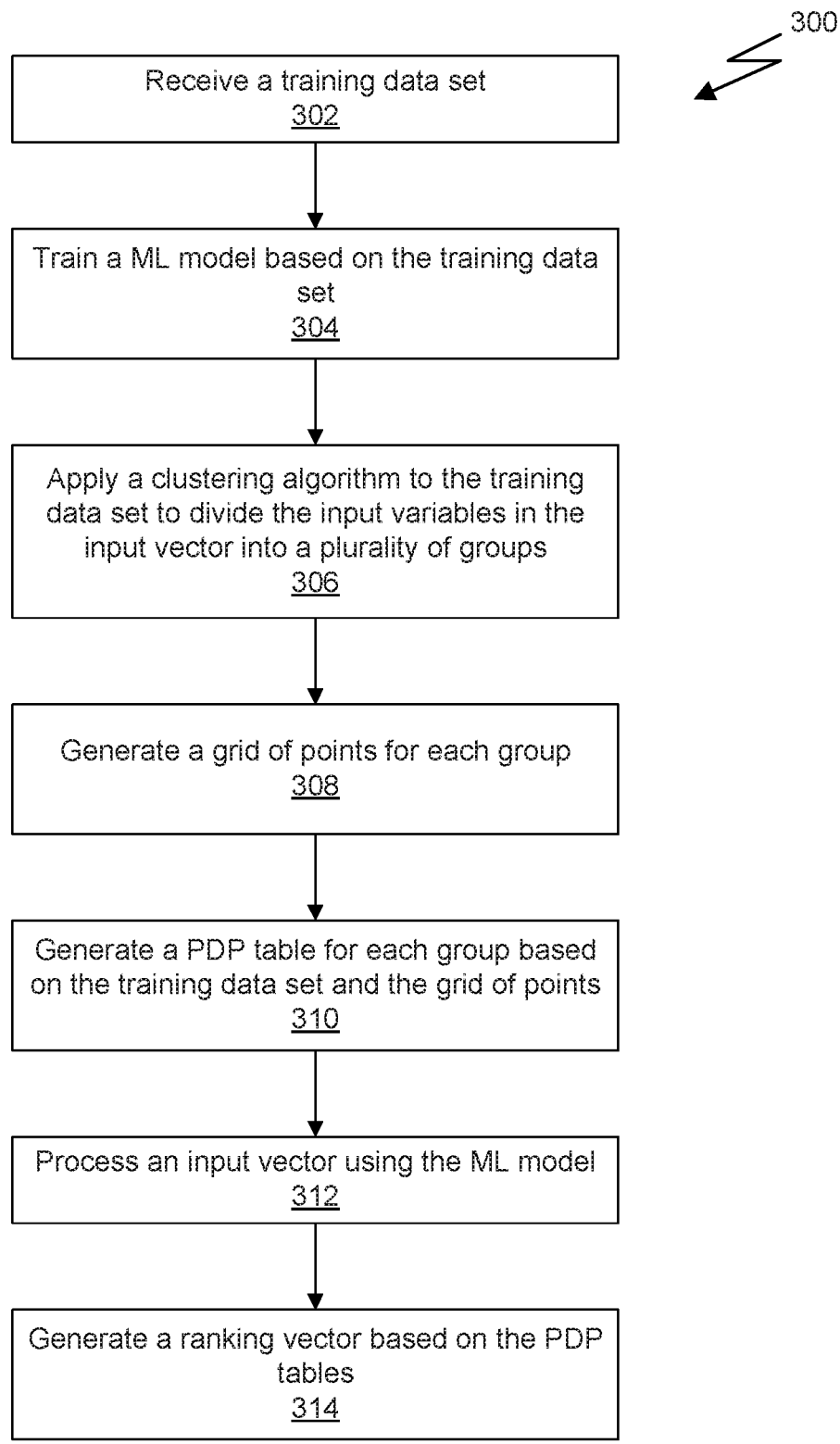
FIG. 3 is a flowchart of a method for analyzing the output of a ML model, in accordance with some embodiments.

FIG. 3 is a flowchart of a method 300 for analyzing the output of a ML model, in accordance with some embodiments. It will be appreciated that the method 300 is described in the context of a processor executing instructions that cause the processor to perform, at least in part, one or more of the steps of the method 300. However, in other embodiments, the method 300 can be performed by hardware or software, or any combination of hardware or software, including the use of a central processing unit (CPU), a graphics processing unit (GPU), a parallel processing unit (PPU), one or more server devices configured to implement a service, or the like.

At step 302, a training data set is received. In an embodiment, the training data set includes a plurality of N input vectors and N corresponding ground truth target output vectors. In some embodiments, the input vectors include parameters related to a customer's financial information such as credit history, bank records, tax records, or the like. In some embodiments, the target output vectors represent one or more classifiers that indicate a score related to whether the customer qualifies for certain financial services, such as whether the customer is approved for a loan, whether the customer is approved to open an account, or an interest rate for a mortgage or credit application.

At step 304, an ML model is trained based on the training data set. In an embodiment, the ML model can be trained by processing each input vector and then adjusting the parameters of the ML model to minimize a difference between the output vector generated by the ML model and the ground truth target output vector. Adjusting the parameters of the ML model can include using backpropagation with gradient descent or any other technically feasible algorithm for training the parameters of the model.

At step 306, a clustering algorithm is applied to the training data set to divide the input variables into a plurality of groups. In an embodiment, the clustering algorithm is classified as a type of principal component analysis (PCA) algorithm. As a specific example, the clustering algorithm can be configured to assign all input variables into a single cluster. The cluster is associated with a linear combination of the variables in the cluster (e.g., the first principal component). This linear combination is a weighted average of the variables that explains as much variance as possible in the training data set. A correlation parameter is calculated for the variables in the cluster, and the correlation parameter is compared to a criteria (e.g., a threshold value). If the criteria is met, then the clustering algorithm stops, but if the criteria is not met, then the cluster is split into two separate non-overlapping clusters.

In an embodiment, splitting a cluster comprises determining a covariance matrix for the input variables in the cluster based on the samples included in the training data set. An oblique rotation of the eigenvectors for the largest two principal components of the covariance matrix is performed and the input variables in the cluster are split according to their distance from the rotated eigenvectors. This split defines the two new clusters. The process is repeated for each of the new clusters until all clusters meet the criteria. The result is a hierarchy of groups of input variables clustered such that the variables within a group have higher correlation with other variables in the group than with other variables in a different group.

In other embodiments, different clustering algorithms can be applied to divide the input variables in the input vector into groups of correlated input variables. In one embodiment, the clustering algorithm is a k-means clustering algorithm. In another embodiment, the PCA algorithm described above can be manually reviewed to determine whether combining a previously split group in the hierarchy of groups can be recombined. Two groups can be recombined when manual analysis of an output of the ML algorithm indicates that the output of the ML model does not change significantly when the groups are combined versus when the groups are separate. In practice, in one embodiment, the significance can be determined based on whether the combination results in the same or a different AARC compared to the AARC generated when the groups are separate.

At step 308, a grid of points is generated for each group of input variables. Once the input variables have been clustered into a plurality of groups, each group can include p input variables, where p is one or more. The value of p can be different for each group. The PDP represents a hypersurface in the p-dimensional space of the group of input variables. However, calculating the PDP for a given input vector can be time consuming and, therefore, lookup tables (LUT), referred to herein as PDP tables, can be used to quickly sample the PDP value associated with a given sample rather than computing the integral of Equation 1. In generating the PDP values, a grid of points are generated within the p-dimensional space, and then PDP values for each of the samples in the grid of points are calculated and stored in the PDP table.

In an embodiment, the grid of points can be randomly distributed within the p-dimensional space. In another embodiment, the grid of points can be uniformly distributed in the p-dimensional space. In some embodiments, the grid of points is generated by randomly or pseudo-randomly selecting $11^p$ points for the group.

At step 310, a PDP table is generated for each group of input variables based on the training data set and a corresponding grid of points. Again, for each point in the grid of points, a corresponding PDP value is calculated in accordance with Equation 1 set forth above. This PDP value is then added to an entry in the PDP table corresponding to a particular point in the grid of points.

At step 312, an input vector is processed using the ML model. As the model has been trained based on the training data set, the ML model generates an output vector corresponding to the input vector.

At step 314, a ranking vector is generated based on the PDP tables. The ranking vector includes a PDP value for each group of input variables, where the PDP value has been generated by sampling the corresponding PDP tables according to the input vector. Given the sparse nature of the grid of points in the PDP table, sampling the PDP table comprises calculating an interpolated PDP value based on two or more samples in the PDP table.

For example, if the PDP table is related to a group including a single input variable, then the interpolation can be based on the two nearest samples to the input vector. In other words, for a particular value of the variable in the input vector, the PDP table includes a closest sample point corresponding to a value less than the value of the variable in the input vector and a closest sample point corresponding to a value greater than the value of the variable in the input vector. If the group contains more than one input variable, say p input variables, then the number of sample points close to the input vector used for interpolation is p+1. The interpolation algorithm can be selected from the group consisting of: a nearest neighbor algorithm; an inverse distance weighting algorithm; a spline interpolation algorithm; and a Delaunay triangulation algorithm.

The PDP values for the identified groups can be ranked and the m largest PDP values can be selected to identify the groups of variables that have the greatest contribution to the output vector produced by the ML model. In some embodiments, the m largest PDP values are used to identify m adverse action reason codes, where each of a plurality of adverse action reasons codes corresponds to a particular group of input variables.

Figure 4:
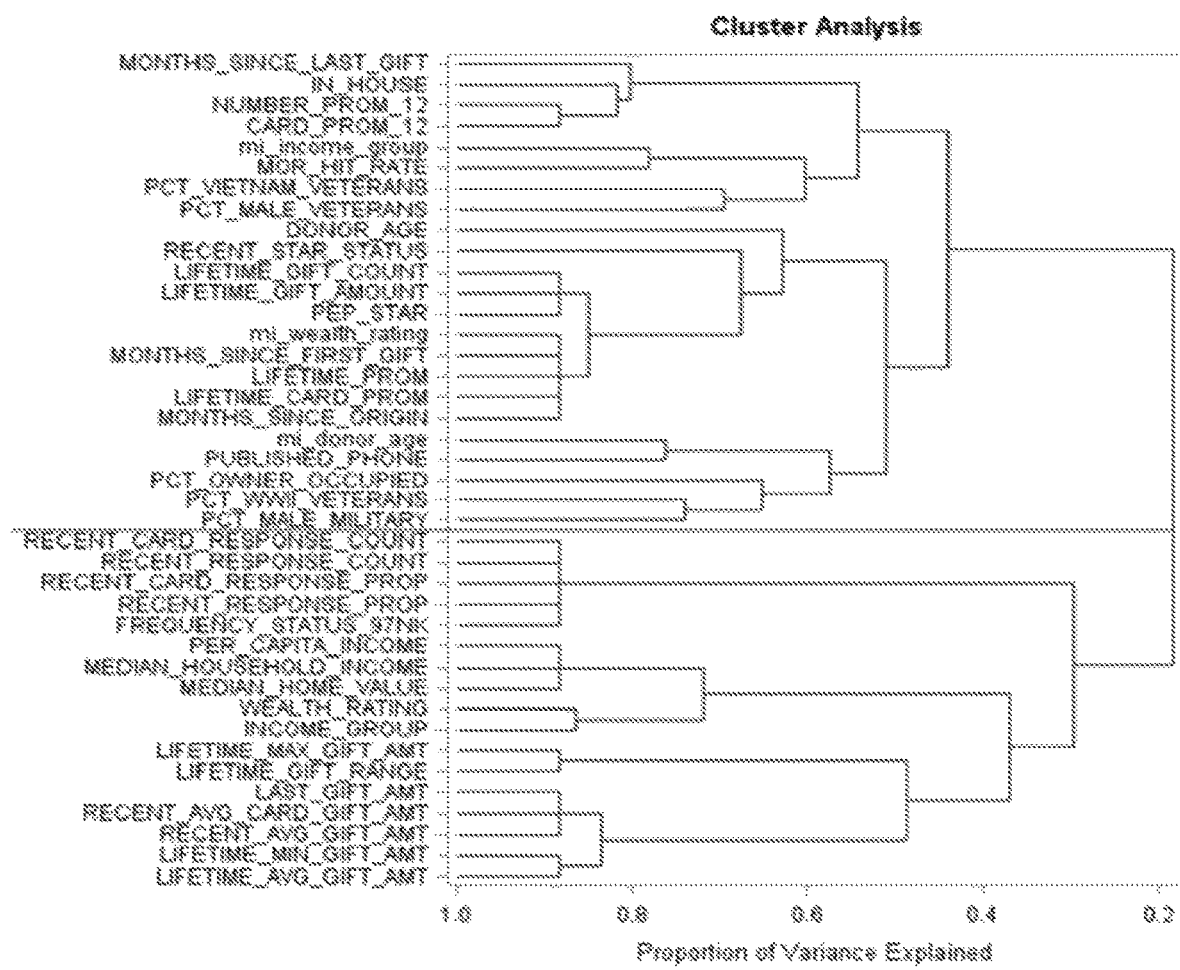
FIG. 4 illustrates input variables for an input vector completely separated in a hierarchical fashion based on a clustering algorithm, in accordance with some embodiments.

FIG. 4 illustrates input variables for an input vector completely separated in a hierarchical fashion based on a clustering algorithm, in accordance with some embodiments. The clustering algorithm illustrated in FIG. 4 is a PROC VARCLUS clustering algorithm developed by SAS® and is closely related to principal component analysis (PCA). In other embodiments, other clustering algorithms can be employed as long as the clustering algorithm is designed to group input variables based on correlation such that a correlation of input variables within a group is stronger than correlation of input variables between groups.

As depicted in FIG. 4, the input vector includes a set of 40 features (e.g., input variables). Examples of the features include "MONTHS_SINCE_LAST_GIFT" and "IN_HOUSE," which are random names given to features and not related to any specific data set. Initially, all 40 features are added to one cluster. A metric value is computed for the initial cluster and compared against a threshold value. If the metric value for the initial cluster is above the threshold value, the initial cluster is split into two clusters. An initial split is illustrated at the line between the "PCT_MALE_MILITARY" variable and the "RECENT_CARD_RESPONSE_COUNT" variable. If the metric value for a cluster is below the threshold value, then the recursion stops and a group of input variables is identified.

In an embodiment, the metric value is the second eigenvalue for the cluster as determined based on a principal component analysis. If the second eigenvalue is large, then that indicates that at least two principal components account for a large amount of variance among the inputs. It will be appreciated that the eigenvalues are related to eigenvectors of the covariance matrix for the set of variables in the cluster. Therefore, the ultimate goal is to split the cluster based on the first principal component until all the variables that remain in the cluster are largely associated with a single dominant principal component.

In some embodiments, the metric value is not used to prematurely end the recursive splitting of the groups. Instead, each cluster is split recursively until all of the clusters only have a single input variable remaining in the cluster. In such cases, a split hierarchy represented within a tree data structure is generated by the clustering algorithm. The groups of input variables are then identified by manual investigation of the tree data structure. As shown in FIG. 4, the splits on the left side of the chart are related to variables of highest average correlation and the splits on the right side of the chart are related to groups of variables with the lowest average correlation. Thus, by reversing splits from left to right in the tree, we can arrive at a set of groups that matches the criteria where correlation of input variables within a group is stronger than correlation of input variables between groups.

A split is reversed, and the input variables associated with the pair of leaf nodes are combined into a single group of input variables, when manual inspection of the variables determines that all of the variables in the pair of leaf nodes are related to the same adverse action reason code. In other words, when the clustering algorithm determines that two sets of variables have high correlation and the variables in the two sets of variables are associated with the same adverse action reason code, then the two sets of variables can be combined into a single group of variables.

As an example, the input variables "NUMBER_PROM_12" and "CARD_PROM_12" would generate the same adverse action reason code and, therefore, they would be combined into a group of input variables. However, the "IN_HOUSE" variable would not generate that same adverse action reason code and, therefore, is not combined into a group with the other two variables. Consequently, the first four input variables shown in the input vector of FIG. 4 would result in three groups of input variables.

It will be appreciated that the clustering algorithm described above is only one potential way to identified groups of correlated input variables within the input vector and that other types of clustering algorithms, including k-means clustering can be used in lieu of the clustering algorithm described above. The clustering algorithm described above is particularly useful within the financial services sector in the specific application of identifying adverse reaction reason codes based on the output of a ML model because this clustering algorithm identifies groups not only based on correlation values between the variables, but on the adverse action reason codes associated with each of the correlated variables.

Figure 5:
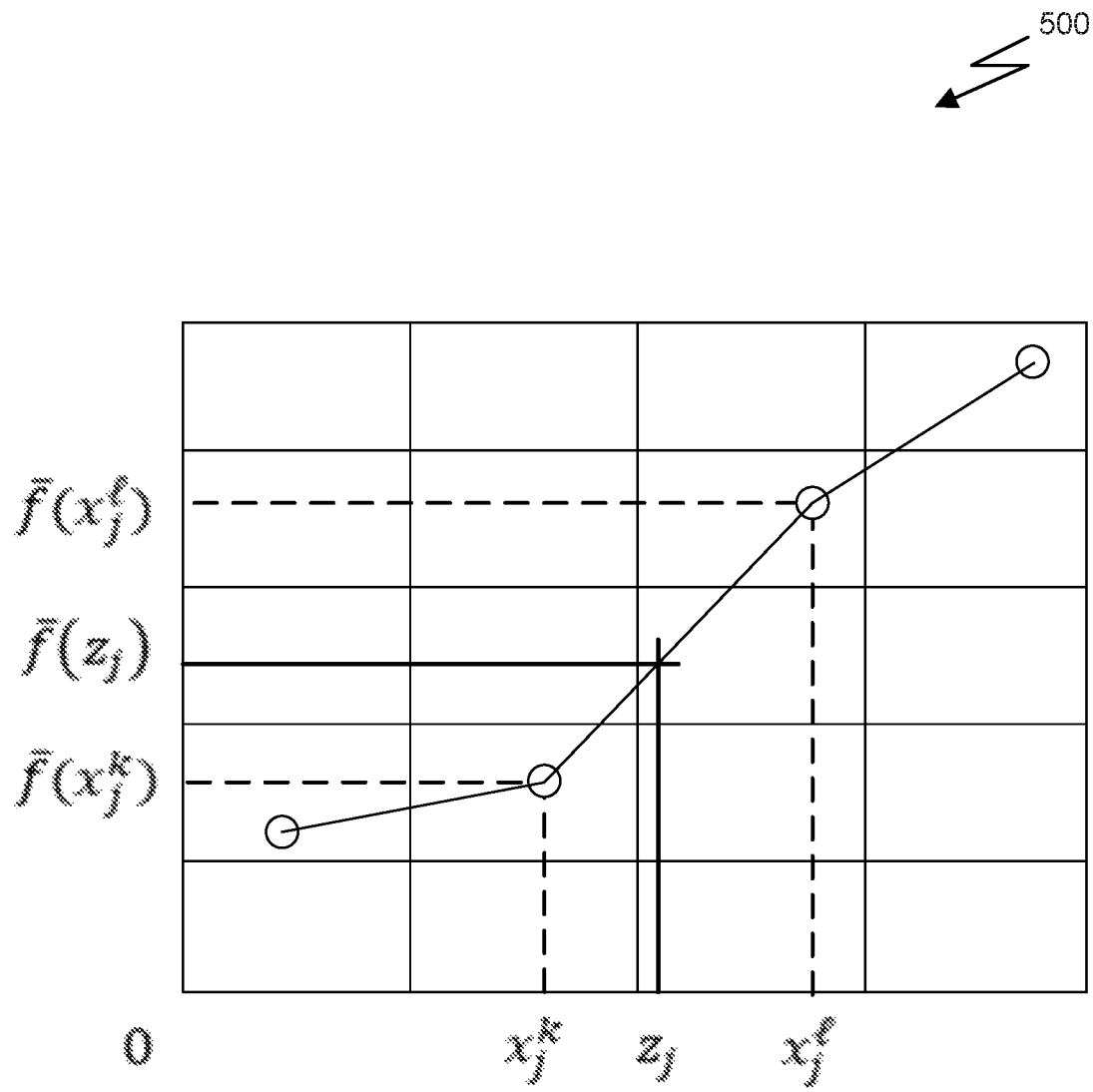
FIG. 5 illustrates an interpolation operation performed using a PDP table, in accordance with some embodiments.

FIG. 5 illustrates an interpolation operation performed using a PDP table, in accordance with some embodiments. Again, a PDP table is a LUT used to calculate a PDP value estimated for an input point $z_j$. The PDP value for a specific group of variables of the input vector, as defined in Equation 1 above, is not typically calculated in practice because the calculated value would be computationally intensive. Instead, a small number of PDP values for a specific grid of sample points are calculated and used to generate the PDP table. Then, for any specific tuple of values sampled from the input vector for a specific group of input variables, the PDP value for that group of input values is estimated by performing an interpolation based on points populated within the PDP table.

For example, the graph 500 illustrated in FIG. 5 shows four sample points (represented as circles) that are included in the PDP table for a group of input variables that includes a single input variable, $x_j$. Then, for a given input point $z_j$, a corresponding PDP table is sampled to find the closest sample points to the input point. As shown, for a PDP table with a single dimension, the closest sample points are given by a closest point corresponding to the maximum input value $x_j^k$ below the value of the input point $z_j$ and a closest sample point corresponding to the minimum input value $x_j^l$ above the value of the input point $z_j$. The estimate of the PDP value for the input point $z_j$ is then calculated by performing the interpolation between $(x_j^k, \bar{f}(x_j^k))$ and point $(x_j^l, \bar{f}(x_j^l))$. In an embodiment, the univariate interpolation can be nearest neighbor, a linear interpolation, or the like.

It will be appreciated that the one-dimensional case illustrated by FIG. 5 only applies to groups that include a single variable. In general, at least one group of variables will includes two or more input variables, and the interpolation algorithm is a multivariate interpolation selected from the group consisting of: a nearest neighbor algorithm; an inverse distance weighting algorithm; a spline interpolation algorithm; and a Delaunay triangulation algorithm.

Figure 6:
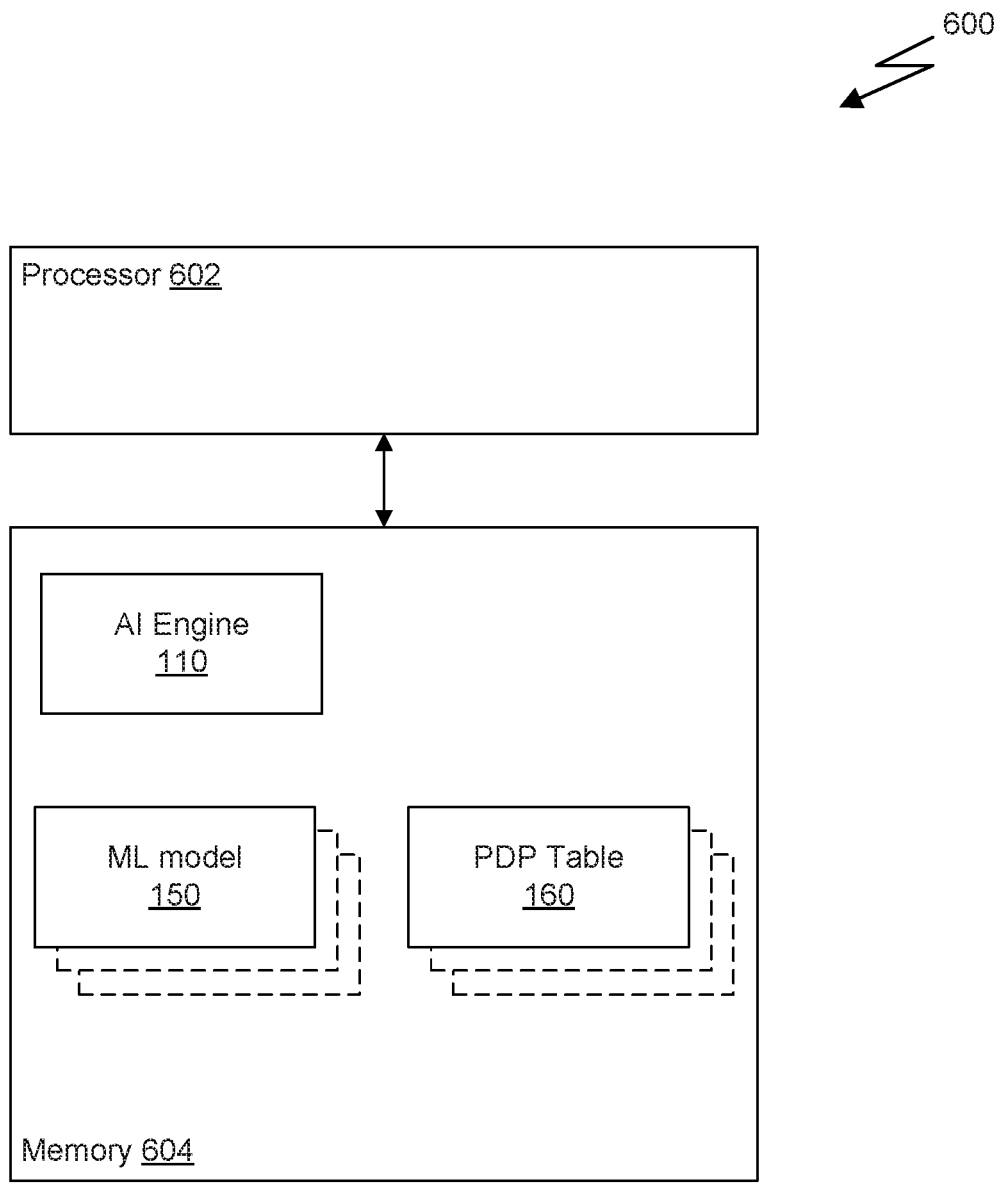
FIG. 6 illustrates an exemplary computer system configured to interpret a ML model, in accordance with some embodiments.

FIG. 6 illustrates an exemplary computer system 600 configured to interpret a ML model, in accordance with some embodiments. The computer system 600 includes a processor 602 and a memory 604. In an embodiment, the processor 602 is a central processing unit (CPU) that is configured to execute a set of instructions for the AI engine 110, stored in the memory 604. The AI engine 110 includes instructions that facilitate the processor 602 to receive an input vector, process the input vector by a ML model to generate an output vector, and generate, based on a plurality of PDP tables stored in the memory 604, a ranking vector that indicates a score for each group of input variables in a plurality of groups of input variables of the input vector. The AI engine 110 can be configured to load a ML model 150 from the memory 604, execute instructions included in the ML model 150 to process the input vector and generate an output vector and then generate the ranking vector by sampling values from one or more PDP tables to calculate the scores for the ranking vector based on the values in the input vector. The PDP tables 160 can be generated and stored in the memory 604 at the same time or subsequent to the training of the ML model 150 based on a set of training data. In one embodiment, each ML model 150 is associated with two or more PDP tables 160, each PDP table corresponding to a different group of input variables in the corresponding input vector, as identified by a clustering algorithm.

In some embodiments, the processor 602 is a parallel processing unit (PPU). Certain ML models 150 can be optimized to run in parallel. For example, Convolutional Neural Networks (CNNs) can involve the processing of convolution operations corresponding to different subsets of the input vector (e.g., images) in parallel. In addition, certain ML models 150 can benefit by parallel training techniques, such as batch training that divides the set of training data into small batches and processes each batch of training data via different instances of the ML model 150 in parallel. The output vectors are then processed by a loss function across all of the batches to generate updated parameters for the ML model 150.

In some embodiments, the system 600 can include two or more processors 602, such as a CPU and a PPU (e.g., graphics processing unit—GPU). In other embodiments, the processor 602 can be implemented as a system on a chip (SoC) that includes one or more CPU cores and one or more GPU cores. In yet other embodiments, the system 600 can be implemented as a server device. A client device can transmit a request to the server device including the input vector and the server device can process the input vector and transmit the output vector and/or the ranking vector back to the client device. In yet other embodiments, the system 600 can include multiple server devices, each server device configured to implement at least a portion of the system functionality. For example, one server device can be configured to run the ML models 150 to generate the output vectors and another server device can be configured to generate the ranking vector based on the PDP tables 160. It will be appreciated that any computer system including one or more processors 602 and one or more memories 604 that is configured to perform the functions described in the Application is contemplated as being within the scope of this disclosure.

Figure 7:
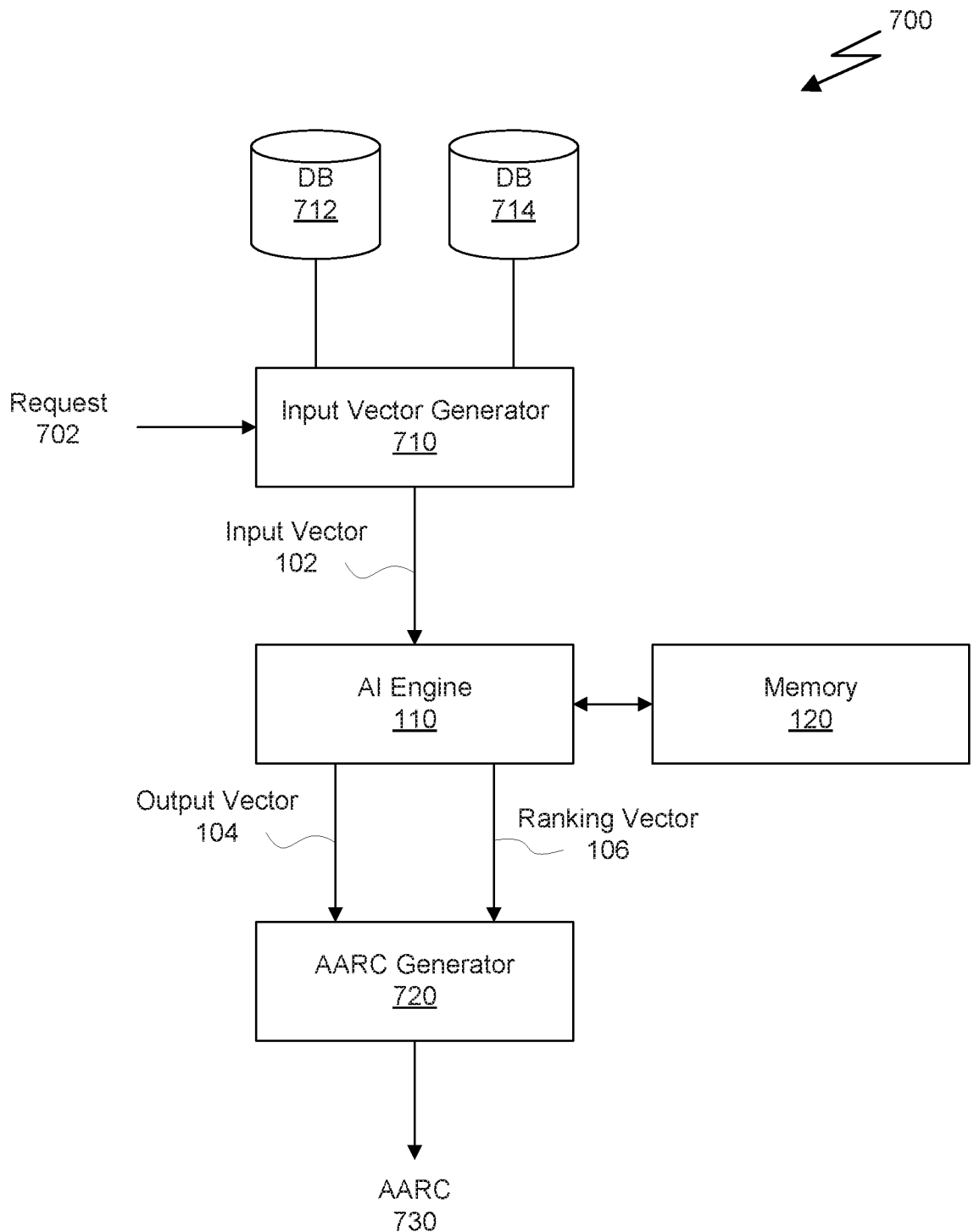
FIG. 7 illustrates a system for generating adverse action reason codes, in accordance with some embodiments.

FIG. 7 illustrates a system 700 for generating adverse action reason codes, in accordance with some embodiments. The system 700 is an example of how ML model interpretability can be utilized within a particular field. Again, financial services companies that offer certain products or services must adhere to Regulation B of the Equal Credit Opportunity Act (ECOA), which mandates that firms engaged in extending credit must do so without regard to certain aspects of the applicant, such as sex, gender, or age. Subsequently, if an applicant is denied credit due to an algorithm that employs a ML model, then that person must be informed as to which factors contributed the most to that decision. The AI engine 110 of FIG. 1 can be employed to aid in this process.

As depicted in FIG. 7, an input vector generator 710 implemented by a server device can receive a request 702 to process a credit application (e.g., determine whether to extend credit to an applicant). The request 702 may include information that identifies the applicant, such as a name of the applicant, a social security number (SSN) of the applicant, or the like. The input vector generator 710 can then access various databases 712, 714 to collect information about the applicant. For example, the database 712 can be related to credit history such as a credit score for the applicant compiled by one or more credit rating agencies. The database 714 can be related to other financial products offered by the financial services corporation, such as a loan history for an auto loan or mortgage that the applicant has opened with the financial services corporation. The various information from one or more sources are collected by the input vector generator 710 and compiled into an input vector 102.

The input vector 102 is transmitted to the AI engine 110, which processes the input vector 102 via an ML model 150 stored in the memory 120 to generate an output vector 104. For example, the output vector 104 can be a binary value that indicates whether the application to extend credit to the applicant is denied or accepted. The AI engine 110 can also generate the ranking vector 106, which corresponds to the output vector 104, based on one or more PDP tables 160 stored in the memory 120. The ranking vector 106 can include a scalar value (e.g., score, PDP value, etc.) for each group of input variables identified via a clustering algorithm.

The adverse action reason code (AARC) generator 720 receives the output vector 104 and determines whether the application is accepted or denied. If the applicant is denied credit (e.g., an adverse decision), then the AARC generator 720 processes the ranking vector 106 to determine m (e.g., m=3) groups of input variables that contributed the most to the denial of the application. The scores in the ranking vector 106 can be sorted and an index of the highest m scores is mapped to a vector, AARC 730, that identifies the AARCs corresponding to the identified groups of input variables that contributed the most to the adverse decision in the output vector 104. Of course, if the application is accepted, processing the ranking vector 106 can be skipped and the vector AARC 730 can be a null vector.

In some embodiments, the AARCs identified in the vector AARC 730 can be processed and used to notify the applicant in compliance with the ECOA. For example, the vector AARC 730 and the output vector 104 can be transmitted to a notification engine (not explicitly shown in FIG. 7) that automatically generates a notification message that includes an indication of whether the application for credit was accepted or denied and, if denied, what were the contributing factors based on the m AARCs included in the vector AARC 730. The notification message can be transmitted to a client device over a network (e.g., sent to a web browser of a client device as part of a web service hosted by the financial services corporation that facilitates customers submitting credit applications), sent via an email messaging protocol, sent via text message (e.g., SMS), or any other type of electronic communications medium.

Figure 8:
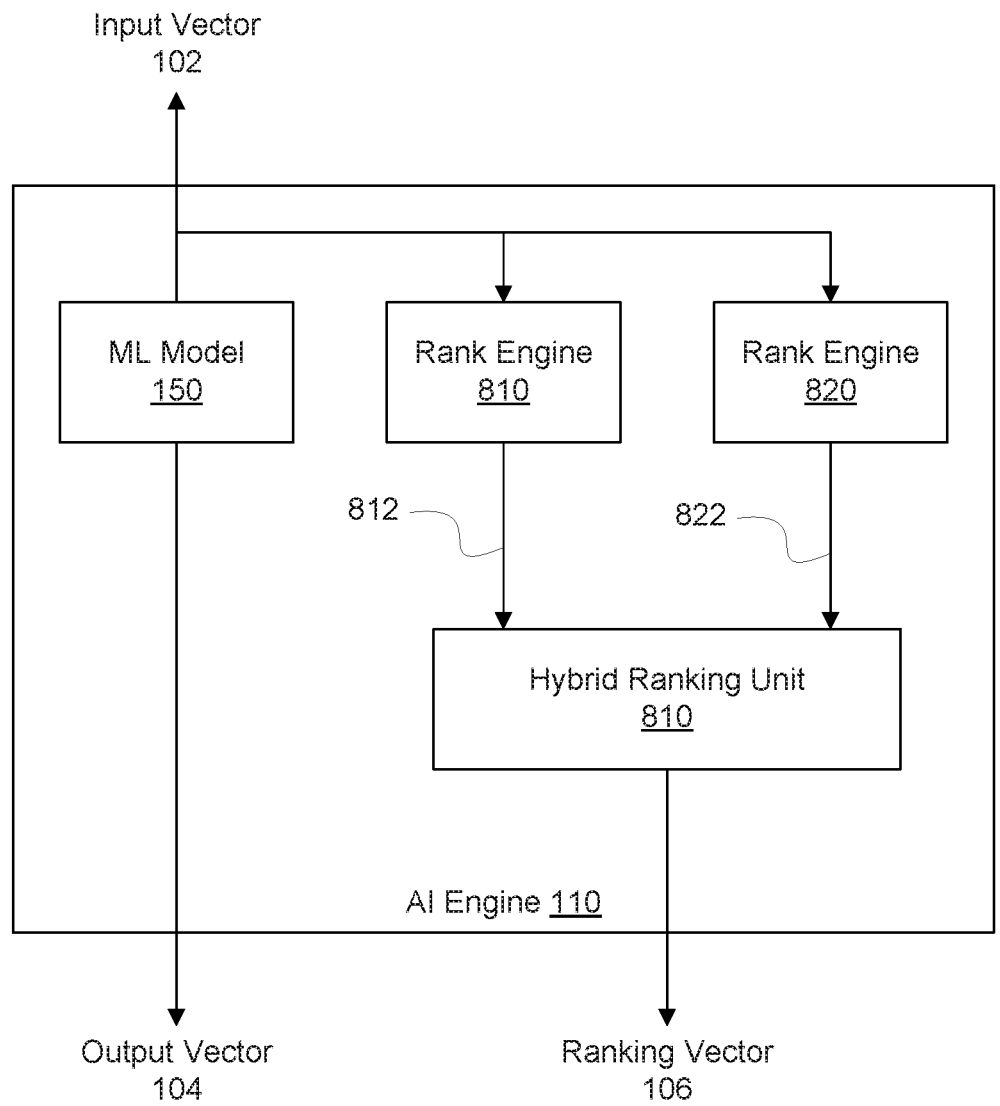
FIG. 8 illustrates a system for generating adverse action reason codes using a hybrid ranking scheme that combines a grouped PDP analysis with a Shapley Additive Explanations analysis, in accordance with some embodiments.

FIG. 8 illustrates a system 800 for generating adverse action reason codes using a hybrid ranking scheme that combines a grouped PDP analysis with a Shapley Additive Explanations analysis, in accordance with some embodiments. The technique set forth above uses a ranking vector based on the group PDP analysis. While the group PDP analysis may be a good choice generally, in some cases, there may be other algorithms that could be substituted for the group PDP analysis. The reason why these algorithms produce such differences is usually due to the different aspects of a predictor that they quantify in relation to the model output, which are all treated as contribution measurements. In order to have an AARC output be informed by these various aspects of predictors and how they contribute to the model output, a hybrid scheme can be employed to combine multiple model interpretability algorithms. In some cases, these other algorithms may be worse in certain respects than the group PDP algorithm. For example, some algorithms may not be model agnostic or may be computationally expensive (e.g., requiring minutes to calculate the scores for a given instance of the input vector). However, in other cases, the tradeoffs are not that significant and a combination of multiple model interpretability algorithms in the output of the AARCs can add value. In particular, use of grouped PDP and Shapley Additive Explanations add a global and local aspect to the AARC.

As depicted in FIG. 8, the system 800 includes an AI Engine 110. The AI Engine 110 receives the ML model 150 from a memory 120 and processes an input vector 102 by the ML model 150 to generate an output vector 104, similar to as described above in system 100 of FIG. 1 and system 700 of FIG. 7. However, in system 800 the ranking vector 106 is generated based on a hybrid ranking scheme that combines ranking vectors compiled based on two or more different algorithms into a hybrid ranking vector that is then output as ranking vector 106. In an embodiment, the ranking vector 106 is compiled as a combination of a group PDP ranking vector 812 generated by a first rank engine 810 and a SHAP ranking vector 822 generated by a second rank engine 820. The group PDP ranking vector 812 is generated using PDP tables generated for groups of input variables, as described in more detail above. However, the SHAP ranking vector 822 is generated based on a different algorithm—the Shapley Additive Explanations (SHAP) algorithm.

In an embodiment, the SHAP algorithm uses the same grouping of input variables as relied on for constructing the group PDP tables. In other words, input variables are grouped according to a clustering algorithm based on PCA related to the primary and secondary eigenvectors of a covariance matrix for the input variables (e.g., PROC VARCLUS). Thus, the raw ranking scores output by the first rank engine 810 and the second rank engine 820 indicate the relative ordering of the same groups of input variables based on either PDP values or SHAP values, respectively.

The SHAP algorithm is based on a game-theoretic concept of the Shapley value, which takes into account all the different combinations between the feature of interest and the rest of the features in the input vector and produces a score (e.g., a scalar value) that represents the contribution of that feature value to the deviation of the model prediction for the specific instance of the input vector from the model's average prediction given the set of training data used to train the model. If X is the feature vector and $S \subset \{1, \ldots, |X|\}$ represents an index set specifying a sub-vector of X, $X_S$, the SHAP value $\phi_i$ of the feature indexed by i is given by:

$$\phi_i = \sum_{S \subset \{1, \ldots, |X|\} \setminus \{i\}} \frac{|S|!(|X|-|S|-1)!}{|X|!} \quad (\text{Eq. 3})$$
$$(\mathbb{E}[f \mid X_{S \cup \{i\}}] - \mathbb{E}[f \mid X_S])$$

SHAP values are based on Shapley values in order to generate contributions of predictor values. Specifically, the SHAP values are shifted Shapley values. It will be appreciated that the SHAP value $\phi_i$ can be rather expensive to compute. For example, the marginal value given by a difference in the expected value of the model f given the sub-vector $X_{S \cup \{i\}}$ and the expected value of the model f given the sub-vector $X_S$ can require a large number of calculations because the expected value depends on the distribution of instances of the complement subset of features in the set of training data. Furthermore, given the summation operator, this process is repeated over all possible coalitions S given a random order of features joining the coalition.

It will be appreciated that, given the grouping of input variables by the clustering algorithm as a starting point and due to the additivity property of SHAP, we can assign the SHAP value of a group of input variables to be the sum of the SHAP values of each variable in the group. Specifically, if S is an index set that specifies the variables in one group, the groups SHAP value $\phi_S$ is given by:

$$\phi_S = \sum_{i \in S} \phi_i \quad (\text{Eq. 4})$$

In an embodiment, an implementation of an algorithm referred to as TreeSHAP, described in Lundberg et al., "Consistent individualized feature attribution for tree ensembles," ArXiv, arxiv:1802.03888 (2019), which is incorporated by reference herein in its entirety, is utilized to compute the SHAP value for each group of input variables defined by the clustering algorithm (e.g., PROC VARCLUS clustering algorithm). TreeSHAP is a fast method for computing SHAP values, but it is limited to tree-based models since the algorithm relies on the tree structure to quickly evaluate SHAP values. Once the SHAP value is calculated for each group of input variables, the groups of input variables can be ranked in descending order of SHAP values.

In some embodiments, a hybrid ranking scheme is implemented by the system 800 to generate AARCs. Instead of relying on the group PDP analysis alone, a plurality of ranking vectors are generated by separate algorithms, and then the plurality of ranking vectors are combined into a single hybrid ranking, which is relied on to generate the AARCs. The hybrid ranking indicates a geometric mean of scores from multiple, independent ranking vectors associated with different model interpretability algorithms (e.g., group PDP or group SHAP).

Each ranking vector is a descending ranking using integer indexes to represent the relative order of scores. In other words, each group of input variables can be assigned an index and the ranking vector can order the indexes according to a descending order of group PDP values or group SHAP values, respectively. Alternatively, each group of input variables can be assigned an order in the ranking vector, and the integer value at a particular index in the ranking vector indicates the score for that group of input variables that represents the relative order of that group of input variables with respect to all other groups of input variables in the input vector.

A hybrid ranking vector can then be generated that indicates a descending order of a hybrid score calculated by calculating the geometric mean of the scores in the plurality of ranking vectors. For example, if a particular group of input variables is ranked 1 in one ranking vector and 3 in another ranking vector, then the geometric mean for that group of input variables is $\sqrt{3}$. The geometric mean is given as:

$$\sqrt[n]{\prod rank_i},\qquad(\text{Eq. 5})$$

where $i \propto \{1 \ldots n\}$. In other words, the geometric mean is the $n^{th}$ root of the product of n raw ranking values. In other embodiments, the arithmetic mean can be used to calculate the hybrid score. It will also be appreciated that the geometric mean and/or the arithmetic mean can result in a tie (e.g., where one group is ranked exactly the opposite of another group in the two different ranking vectors). In such cases, certain tie-breaking scenarios can be enacted, such as by ranking the group ahead of another that ranked higher in a particular ranking vector (e.g., group PDP dominates for purposes of tie-breaking scenarios).

The ranking vector 106 is then calculated by re-ordering the groups of input variables based on the geometric mean score calculated from a plurality of independent ranking vectors. Although the example shown in FIG. 8 only shows two different ranking engines outputting two ranking vectors that are combined into a hybrid ranking vector, in some embodiments, three or more separate rankings can be combined using the geometric mean from the plurality of ranking vectors.

Figure 9:
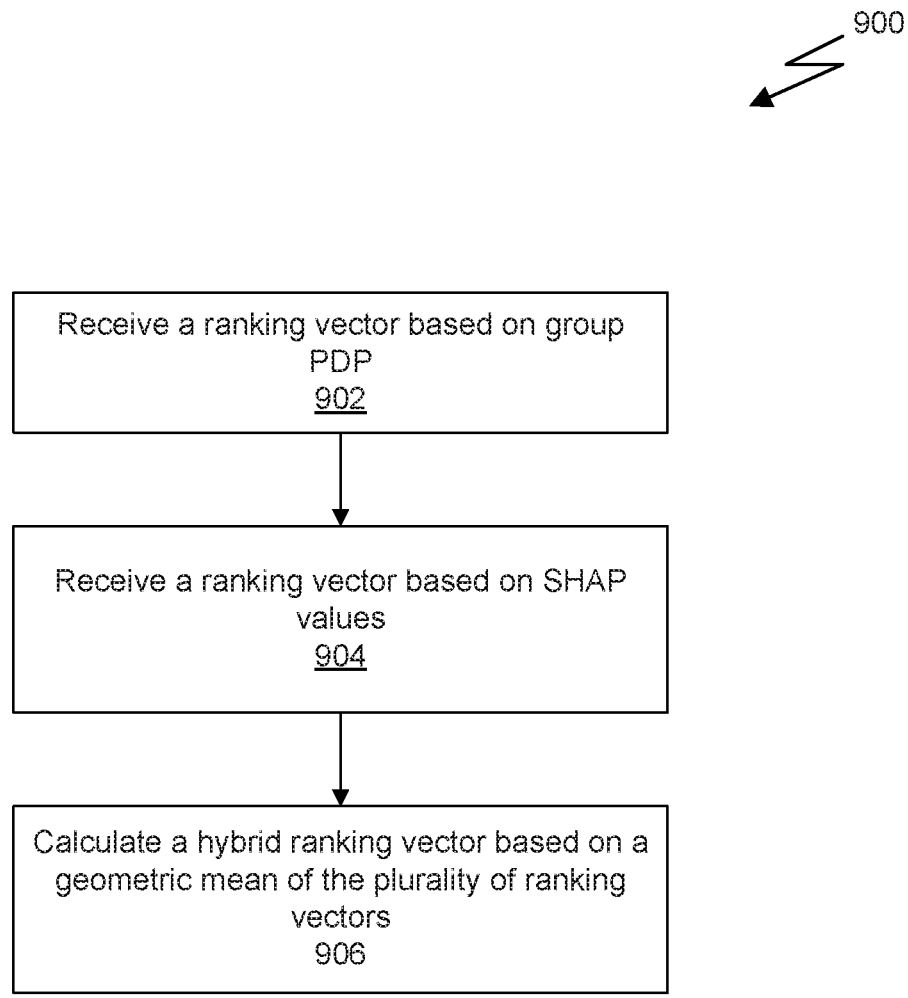
FIG. 9 is a flowchart of a method for analyzing the output of a ML model using the hybrid ranking scheme, in accordance with some embodiments.

FIG. 9 is a flowchart of a method for generating a ranking vector according to a hybrid ranking scheme, in accordance with some embodiments.

At step 902, a first ranking vector is received based on a group PDP algorithm. In an embodiment, the first ranking vector is based on PDP values calculated by sampling PDP tables stored in a memory and based on a training data set for a ML model.

At step 904, a second ranking vector is received based on SHAP values. In an embodiment, the second ranking vector is based on SHAP values for groups of input variables in a particular input vector calculated using a TreeSHAP algorithm.

Optionally, additional ranking vectors can be received based on different algorithms such as Local Interpretable Model-agnostic Explanations (LIME); Accumulated Local Effects (ALE); and/or Explainable Neural Networks (xNN).

At step 906, a hybrid ranking vector is calculated based on a geometric mean of the scores in the plurality of ranking vectors. The hybrid ranking vector is a ranking based on the combination of individual rankings generated using different techniques for model interpretability. In an embodiment, the hybrid ranking vector is output by the AI engine 110 to an AARC generator 720 as the ranking vector 106.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method carried out by a computing system comprising one or more processors and at least one non-transitory computer-readable medium, the method comprising:
   training a machine learning model by carrying out a machine learning process on a training dataset comprising a set of input vectors and a corresponding set of output scores, wherein the trained machine learning model is configured to (i) receive an input vector comprising respective values for a given set of input variables and (ii) based on an evaluation of the received input vector, output a score for use in rendering a given type of classification decision;

based on an evaluation of correlations between input variables of the trained machine learning model, dividing the trained machine learning model's given set of input variables into a plurality of variable groups that each comprises one or more input variables;

constructing a respective partial dependence plot (PDP) table for each respective variable group in the plurality of variable groups by: (i) generating a respective grid of sample points within a space having a number of dimensions that corresponds to a number of input variables in the respective variable group, wherein each sample point in the respective grid of sample points comprises a value for each of the one or more input variables in the respective variable group, (ii) using a partial dependence function for the trained machine learning model to compute, for each sample point in the respective grid of sample points, a corresponding PDP value that indicates a contribution of the respective variable group to the trained machine learning model's output for the sample point, and (iii) encoding the respective grid of sample points and the corresponding PDP values into a lookup table that is to be utilized as the respective PDP table for the respective variable group;

after training the machine learning model and constructing the respective PDP table for each respective variable group in the plurality of variable groups:
receiving an input vector comprising respective values for the given set of input variables;
inputting the received input vector into the trained machine learning model and thereby causing the trained machine learning model to output a score for the received input vector;
based on the score for the received input vector, rendering the given type of classification decision for the received input vector; and
for each respective variable group in the plurality of variable groups, determining a respective contribution of the respective variable group to the score for the received input vector without using the partial dependence function for the trained machine learning model by: (i) accessing the respective PDP table for the respective variable group, (ii) based on the received input vector's one or more respective values for the respective variable group's one or more variables, identifying two or more sample points in the PDP table that neighbor the given input vector, wherein each identified sample point has a corresponding PDP value, and (iii) performing an interpolation of the two or more identified sample points and thereby determining an interpolated PDP value that indicates the respective contribution of the respective variable group to the score for the received input vector.

2. The method of claim 1, wherein dividing the trained machine learning model's given set of input variables into the plurality of variable groups based on the evaluation of correlations between input variables of the trained machine learning model comprises:
dividing the trained machine learning model's given set of input variables into the plurality of variable groups by applying a clustering algorithm for grouping variables based on correlation to a set of input vectors that each comprise respective values for the given set of input variables.

3. The method of claim 1, wherein, for each respective variable group in the plurality of variable groups, generating the respective grid of sample points within the space having the number of dimensions that corresponds to the number of input variables in the respective variable group comprises:
generating the respective grid of sample points by randomly or pseudo-randomly selecting $11^p$ sample points within the space having the number of dimensions that corresponds to the number of input variables in the respective variable group, wherein p represents the number of dimensions.

4. The method of claim 1, wherein the given type of classification decision comprises a decision of whether to extend credit to a consumer, the method further comprising:
based on the respective contribution that is determined for each respective variable group, identifying a given subset of one or more variable groups that contribute most to the score for the received input vector; and
generating one or more adverse action reason codes corresponding to the identified one or more variable groups, wherein each of the one or more adverse action reason codes indicates a respective reason why credit was not extended to the consumer.

5. The method of claim 4, further comprising:
transmitting a communication to a device associated with the consumer, wherein the communication includes information corresponding to the one or more adverse action reason codes.

6. The method of claim 1, wherein, for each respective variable group that includes at least two input variables, performing the interpolation of the two or more identified sample points comprises performing a multivariate interpolation of the two or more identified sample points.

7. The method of claim 6, wherein the multivariate interpolation is performed using at least one of a nearest neighbor algorithm; an inverse distance weighting algorithm; a spline interpolation algorithm; or a Delaunay triangulation algorithm.

8. The method of claim 1, wherein the trained machine learning model comprises one of:
a neural network model; a linear or logistic regression model; or a gradient boosting machine model.

9. The method of claim 1, wherein, for each respective variable group in the plurality of variable groups, the respective contribution that is determined based on the respective PDP table for the respective variable group comprises a first respective contribution for the respective variable group, the method further comprising, for each respective variable group in the plurality of variable groups:
determining a second respective contribution of the respective variable group to the score for the received input vector using a Shapley Additive Explanation (SHAP) analysis; and
determining a respective hybrid contribution of the respective variable group to the score for the received input vector by calculating a geometric or arithmetic mean of the first respective contribution and the second respective contribution determined for the respective variable group.

10. The method of claim 1, wherein rendering the given type of classification decision for the received input vector comprises rendering a decision not to extend credit to a given consumer, and wherein determining the respective contribution of each respective variable group to the score for the received input vector comprises:
  determining the respective contribution of each respective variable group to the score for the received input vector in response to rendering the decision not to extend credit to the given consumer.

11. The method of claim 1, wherein using the partial dependence function for the trained machine learning model to compute, for each sample point in the respective grid of sample points, the corresponding PDP value comprises, for a given sample point:
  applying the partial dependence function to the trained machine learning model that takes, as input, the given sample point.

12. A computing system comprising:
  at least one non-transitory computer-readable medium;
  one or more processors; and
  program instructions stored on the at least one non-transitory computer-readable medium that are executable by the one or more processors such that the computing system is configured to:
    train a machine learning model by carrying out a machine learning process on a training dataset comprising a set of input vectors and a corresponding set of output scores, wherein the trained machine learning model is configured to (i) receive an input vector comprising respective values for a given set of input variables and (ii) based on an evaluation of the received input vector, output a score for use in rendering a given type of classification decision;
    based on an evaluation of correlations between input variables of the trained machine learning model, divide the trained machine learning model's given set of input variables into a plurality of variable groups that each comprises one or more input variables;
    construct a respective partial dependence plot (PDP) table for each respective variable group in the plurality of variable groups by: (i) generating a respective grid of sample points within a space having a number of dimensions that corresponds to a number of input variables in the respective variable group, wherein each sample point in the respective grid of sample points comprises a value for each of the one or more input variables in the respective variable group, (ii) using a partial dependence function for the trained machine learning model to compute, for each sample point in the respective grid of sample points, a corresponding PDP value that indicates a contribution of the respective variable group to the trained machine learning model's output for the sample point, and (iii) encoding the respective grid of sample points and the corresponding PDP values into a lookup table that is to be utilized as the respective PDP table for the respective variable group;
    after training the machine learning model and constructing the respective PDP table for each respective variable group in the plurality of variable groups:
      receive an input vector comprising respective values for the given set of input variables;
      input the received input vector into the trained machine learning model and thereby cause the trained machine learning model to output a score for the received input vector;
      based on the score for the received input vector, render the given type of classification decision for the received input vector; and
      for each respective variable group in the plurality of variable groups, determine a respective contribution of the respective variable group to the score for the received input vector without using the partial dependence function for the trained machine learning model by: (i) accessing the respective PDP table for the respective variable group, (ii) based on the received input vector's one or more respective values for the respective variable group's one or more variables, identifying two or more sample points in the PDP table that neighbor the given input vector, wherein each identified sample point has a corresponding PDP value, and (iii) performing an interpolation of the two or more identified sample points and thereby determining an interpolated PDP value that indicates the respective contribution of the respective variable group to the score for the received input vector.

13. The computing system of claim 12, wherein the program instructions that are executable by the one or more processors such that the computing system is configured to divide the trained machine learning model's given set of input variables into the plurality of variable groups based on the evaluation of correlations between input variables of the trained machine learning model comprise program instructions that are executable by the one or more processors such that the computing system is configured to:
  divide the trained machine learning model's given set of input variables into the plurality of variable groups by applying a clustering algorithm for grouping variables based on correlation to a set of input vectors that each comprise respective values for the given set of input variables.

14. The computing system of claim 12, wherein the given type of classification decision comprises a decision of whether to extend credit to a consumer, and wherein the computing system further comprises program instructions stored on the at least one non-transitory computer-readable medium that are executable by the one or more processors such that the computing system is configured to:
  based on the respective contribution that is determined for each respective variable group, identify a given subset of one or more variable groups that contribute most to the score for the received input vector; and
  generate one or more adverse action reason codes corresponding to the identified one or more variable groups, wherein each of the one or more adverse action reason codes indicates a respective reason why credit was not extended to the consumer.

15. The computing system of claim 14, further comprising program instructions stored on the at least one non-transitory computer-readable medium that are executable by the one or more processors such that the computing system is configured to:
  transmit a communication to a device associated with the consumer, wherein the communication includes information corresponding to the one or more adverse action reason codes.

16. The computing system of claim 12, wherein, for each respective variable group that includes at least two input variables, performing the interpolation of the two or more identified sample points comprises performing a multivariate interpolation of the two or more identified sample points.

17. The computing system of claim 16, wherein the multivariate interpolation is performed using at least one of a nearest neighbor algorithm; an inverse distance weighting algorithm; a spline interpolation algorithm; or a Delaunay triangulation algorithm.

18. The computing system of claim 12, wherein, for each respective variable group in the plurality of variable groups, the respective contribution that is determined based on the respective PDP table for the respective variable group comprises a first respective contribution for the respective variable group, and wherein the computing system further comprises program instructions stored on the at least one non-transitory computer-readable medium that are executable by the one or more processors such that the computing system is configured to, for each respective variable group in the plurality of variable groups:
   determine a second respective contribution of the respective variable group to the score for the received input vector using a Shapley Additive Explanation (SHAP) analysis; and
   determine a respective hybrid contribution of the respective variable group to the score for the received input vector by calculating a geometric or arithmetic mean of the first respective contribution and the second respective contribution determined for the respective variable group.

19. The computing system of claim 12, wherein using the partial dependence function for the trained machine learning model to compute, for each sample point in the respective grid of sample points, the corresponding PDP value comprises, for a given sample point:
   applying the partial dependence function to the trained machine learning model that takes, as input, the given sample point.

20. A non-transitory computer-readable media storing computer instructions that, when executed by one or more processors, cause a computer system to perform functions comprising:
   training a machine learning model by carrying out a machine learning process on a training dataset comprising a set of input vectors and a corresponding set of output scores, wherein the trained machine learning model is configured to (i) receive an input vector comprising respective values for a given set of input variables and (ii) based on an evaluation of the received input vector, output a score for use in rendering a given type of classification decision;
   based on an evaluation of correlations between input variables of the trained machine learning model, dividing the trained machine learning model's given set of input variables into a plurality of variable groups that each comprises one or more input variables;
   constructing a respective partial dependence plot (PDP) table for each respective variable group in the plurality of variable groups by: (i) generating a respective grid of sample points within a space having a number of dimensions that corresponds to a number of input variables in the respective variable group, wherein each sample point in the respective grid of sample points comprises a value for each of the one or more input variables in the respective variable group, (ii) using a partial dependence function for the trained machine learning model to compute, for each sample point in the respective grid of sample points, a corresponding PDP value that indicates a contribution of the respective variable group to the trained machine learning model's output for the sample point, and (iii) encoding the respective grid of sample points and the corresponding PDP values into a lookup table that is to be utilized as the respective PDP table for the respective variable group;
   after training the machine learning model and constructing the respective PDP table for each respective variable group in the plurality of variable groups:
      receiving an input vector comprising respective values for the given set of input variables;
      inputting the received input vector into the trained machine learning model and thereby causing the trained machine learning model to output a score for the received input vector;
      based on the score for the received input vector, rendering the given type of classification decision for the received input vector; and
      for each respective variable group in the plurality of variable groups, determining a respective contribution of the respective variable group to the score for the received input vector without using the partial dependence function for the trained machine learning model by: (i) accessing the respective PDP table for the respective variable group, (ii) based on the received input vector's one or more respective values for the respective variable group's one or more variables, identifying two or more sample points in the PDP table that neighbor the given input vector, wherein each identified sample point has a corresponding PDP value, and (iii) performing an interpolation of the two or more identified sample points and thereby determining an interpolated PDP value that indicates the respective contribution of the respective variable group to the score for the received input vector.

* * * * *